United States Patent [19]

Lehman et al.

[11] Patent Number: 4,763,317
[45] Date of Patent: Aug. 9, 1988

[54] DIGITAL COMMUNICATION NETWORK ARCHITECTURE FOR PROVIDING UNIVERSAL INFORMATION SERVICES

[75] Inventors: Harvey R. Lehman, Batavia; William P. Lidinsky, Naperville; Harry E. Mussman, Glen Ellyn; David A. Spicer, Batavia; David Vlack, St. Charles, all of Ill.

[73] Assignee: American Telephone and Telegraph Company, AT&T Bell Laboratories, Murray Hill, N.J.

[21] Appl. No.: 809,196

[22] Filed: Dec. 13, 1985

[51] Int. Cl.⁴ ............................................. H04Q 11/04
[52] U.S. Cl. ......................................... 370/58; 370/60
[58] Field of Search ................. 370/60, 94, 110.1, 58, 370/68.1

[56] References Cited

U.S. PATENT DOCUMENTS

| | | | |
|---|---|---|---|
| 3,573,377 | 4/1971 | Anderson et al. | 179/2 |
| 3,612,767 | 10/1971 | Anderson et al. | 179/2 TV |
| 3,647,980 | 3/1972 | Fabiano, Jr. et al. | 179/18 ES |
| 3,673,355 | 9/1970 | LaMarche et al. | 179/170.6 |
| 4,135,202 | 1/1979 | Cutler | 358/86 |
| 4,252,404 | 2/1981 | DiVita | 350/96.16 |
| 4,257,119 | 3/1981 | Pitroda | 370/58 |
| 4,282,400 | 8/1981 | Ribera et al. | 178/73 |

(List continued on next page.)

FOREIGN PATENT DOCUMENTS 2538638 3/1977 France.

OTHER PUBLICATIONS

J. Conradi et al., "Service Integration Comes to Life in the Lab", *Telesis*, 1982 two, pp. 7-11.

(List continued on next page.)

Primary Examiner—Douglas W. Olms
Assistant Examiner—Wellington Chin
Attorney, Agent, or Firm—David Volejnicek

[57] ABSTRACT

A switched integrated wideband and narrowband multiservices digital network (FIGS. 1 and 2) is an ISDM providing universal information services based on wideband and narrowband voice, data, and video communications. It comprises a plurality of service areas (100, 101), each served by a central switching node (110). The central node is connected to a plurality of remote nodes (103) by feeder optical fibers (107) and a control bus extension (106). Network interface equipment (104) at subscribers' (102) premises is connected to remote nodes by distribution optical fibers (105). Each distribution fiber is wavelength-division multiplexed and carries modulated (pulse-analog, pulse-code, or differential pulse-code) wideband digital channels (205) and a multiplexed channel (206) comprising 32 time-division-multiplexed narrowband digital channels (207). One narrowband channel (207D) carries all signaling messages. Feeder fibers are wavelength-division multiplexed and carry modulated wideband digital channels (305), and multiplexed channels (306) each comprising a plurality of time-division-multiplexed distribution multiplexed channels. Each remote node comprises a digital space-division switch (505) for wideband channels, and a digital time-division multiplexer and demultiplexer (506) for multiplexed channels. Each central node comprises a digital space-division switch (606) for wideband channels, and a digital time-division switch (607) for narrowband channels. All switches are controlled by a central node control complex (612) over a control bus (116) and its extensions. Signaling messages are transferred between the signaling-message-carrying narrowband channels and the central node complex by a subscriber signaling subsystem (613) via the narrowband switch and the control bus. A central node optionally includes interfaces (615-618) to other communication systems, and trunk communication fiber (112) and CCIS signaling fiber (117) connections to other central nodes of the network.

40 Claims, 14 Drawing Sheets

U.S. PATENT DOCUMENTS

| | | | |
|---|---|---|---|
| 4,367,548 | 1/1983 | Cotten, Jr. et al. | 370/3 |
| 4,384,323 | 5/1983 | Ahuja | 364/200 |
| 4,402,008 | 8/1983 | Teraslinna | 358/86 |
| 4,441,180 | 4/1984 | Schussler | 370/3 |
| 4,442,320 | 4/1984 | James et al. | 179/5 R |
| 4,446,555 | 5/1984 | Devault et al. | 370/94 |
| 4,450,554 | 5/1984 | Steensma et al. | 370/4 |
| 4,467,468 | 8/1984 | Miller | 370/3 |
| 4,535,360 | 8/1985 | Briley et al. | 358/181 |
| 4,596,010 | 6/1986 | Becker et al. | 370/60 |

OTHER PUBLICATIONS

E. H. Hafer et al., "A Virtual Switching Machine for the 5ESS ™ Switching System", *IEEE Global Telecommunications Conference* (Globecom 1984), *Record*, vol. 1, pp. 6.1[6].1-5 (11/1984).

T. Madej et al., "Controlling the Network of the 5ESS ™ Switching System", IEEE Global Telecommunications Conference (Globecom 1984), *Record*, vol. 1, pp. 6.2.1-5 (1/1984).

G. Gara et al., "The Future-Subscriber Loop Applications", *Telesis*, 1981 two, pp. 36-37.

E. Braun, "BIGFON Points the Way to New Forms of Communication", *Siemens Review L* (1983), No. 1, pp. 10-14.

M. Clost et al., "Perspectives of Evolution Towards the Integrated Services Digital Network", IEEE Publication Reprint, 1982, pp. 315.1-8.

M. Koyama et al., "Optical Subscriber Loop System for Business Premises and Local Area Applications-Field Trial", *Review of the Electrical Communication Laboratories*, vol. 32, No. 4 (1984), pp. 554-562.

J. van der Heijen, "DIVAC-An Experimental Optical-Fibre Communications Network", *Philips Technical Review*, vol. 41, No. 9 (1983/84), pp. 253-259.

S. Ahuja, "S/NET: A High-Speed Interconnect for Multiple Computers", *IEEE Journal of Selected Areas in Communications*, vol. SAC-1, No. 5 (11/1984).

"AT&T VIVID Teleconferencing System", Network Planning Letter-Transmission Systems, publication of AT&T.

"A New Communications Alternative for Your Business", AT&T brochure packet (1985).

C. A. Dahlbom et al., "History and Description of a New Signaling System", *The Bell System Technical Journal*, vol. 57, No. 2 (2/1978), pp. 225-250.

H. Ohnsorge, "From Voice to Video Communication", *Electrical Communication*, vol. 58, No. 1 (1983), pp. 127-130.

P. Belforte et al., "New Switching Techniques for Wideband and ISDN Environments", *CSELT Technical Reports*, vol. 12, Suppl. to No. 3 (Jun. 1984), pp. 301-311.

D. Bottle, "Switching of 140 Mbit/s Signals in Broadband Communication Systems", *Electrical Communication*, vol. 58, No. 4 (1984), pp. 450-452.

G. Oliver, "The Integrated Services Digital Network", *Conf. on Comms. Eqpt. and Systems*, (Birmingham, U.K., 20-22 Apr. 1982), pp. 8-13.

G. Oliver, "System Evolution-Integrated Services Networks", ISS'81 CIC (Montreal, 21-25 Sep. 1981), Sess. 41B, Paper 1.

D. Hardy et al., "PALME: A Switching System Integrating Voice and Data", ISS'81 CIC (Montreal, 21-25 Sep. 1981), Sess. 21B, Paper 2.

K. Frieser et al., "Digital Concentrators in the EWSD Telephone Switching System", Telecom Report 5 (1982), No. 4, pp. 262-266.

SWITCHED INTEGRATED MULTISERVICES
DIGITAL WIDEBAND NETWORK

DIGITAL COMMUNICATION NETWORK ARCHITECTURE FOR PROVIDING UNIVERSAL INFORMATION SERVICES

TECHNICAL FIELD

The invention relates to an integrated services digital network, and particularly relates to a communication network that switches and transports both wideband and narrowband digital communication channels to and between subscriber premises for the purpose of providing voice, data, and video communications to subscribers.

BACKGROUND OF THE INVENTION

Conventionally, different kinds of communication systems are used to provide voice, data, and video communication services to subscribers. For example, a telephone system is conventionally used to provide voice services, a circuit-switched data system or a switched packet network is used to provide data services, and a cable television (CATV) network is used to provide motion video transmission services. These systems exist side-by-side, and each has its own specific design requirements and limitations (for example, in terms of transmission encoding format and modulation, available bandwidth, and signaling protocol), that make each uniquely suited for providing one service, but generally poorly suited for providing a different service. For example, the persubscriber end-to-end bandwidth of the telephone network is too narrow to provide a broad range of data communications efficiently, and it is wholly insufficient for providing motion video services. And a CATV network is ill-suited for providing two-way communications, particularly interactive services. Hence, the various systems exist side-by-side, and each typically provides either only one service or a very limited spectrum of services.

Such proliferation of many parallel facilities each having only limited use is obviously very inefficient. What's more, even though certain of these systems are very new, future services are already being envisioned which exceed the intrinsic capabilities of these systems and hence will require the installation of yet other communication systems. Clearly, what is needed is a single system that is capable of providing universal information services: all current communication services, as well as new communication services that may foreseeably be desired in the future.

Significant effort is being devoted internationally to define a system that would provide in a single digital network at least some plurality of voice and data services that have heretofore been provided by separate systems. A system of this nature is generally referred to as an integrated services digital network (ISDN). For example, the International Consultative Committee on Telephony and Telegraphy (CCITT) is carrying on the work of trying to develop a set of international standards for an ISDN. However, most of this effort is devoted to specifying the form that communications being transported to or from a subscriber should take, and the communication protocol under which communication paths to and from a subscriber should be established. But a design of a communication network that supports the communication protocol, implements the communication format, and actually provides envisioned voice, data, and video services in integrated form, is lacking in the art.

SUMMARY OF THE INVENTION

This invention is directed to solving these and other disadvantages of the prior art. Broadly, the invention is a communication network structured to carry both wideband and narrowband communications between equipment connected thereto. The network is suited for providing universal information services, as it supports all foreseeable forms of audio, data, and image communications. Selected examples of the various services that may be provided over such a network are: telephony, high-fidelity audio, telemetry, packet-switched interactive data (i.e., home information services and business information services, such as catalog shopping, electronic newspapers, menu perusal, theatre listings, electronic funds transfer, and stock quotations), facsimile, 64 Kbps data, bulk data (at various rates), high quality full motion color broadcast one-way video (TV), restricted one-way video (pay TV), switched one-way video (video-on-demand), switched two-way video (video telephone), video shopping, and video conferencing. The network supports simultaneous use of combinations of such services, either as independent communications or as parts of a single integrated communication. In essence, then, the network supports the services provided with combined use of the telephone networks, data transport networks, and CATV systems—plus more—and does so at a lower cost than the combination of these systems. Further, the network anticipates and supports types and qualities of services that are not possible with these systems. Examples of the anticipated services are high-definition television (HDTV) and stereophonic audio with video. And the network provides both narrowband and wideband channels all the way to subscriber premises so subscribers are potentially able to make use of whatever services the network supports.

For purposes of this application, "narrowband" and "wideband" are defined in terms of unidirectional communication channel bandwidth. A narrowband channel is one having a bandwidth of up to and including 64 Kbps, and a wideband channel is one having a bandwidth exceeding 64 Kpbs. Typically, a narrowband channel has a bandwidth of 64 Kpbs or integral submultiples thereof, i.e., 32 Kbps, 16 Kbps, 8 Kbps, or 4 Kbps. Also typically, a wideband channel has a bandwidth of in excess of about 1.5 Mbps, as services requiring lesser bandwidth than 1.5 Mbps can generally be provided by a plurality of narrowband channels used together. Furthermore, a wideband channel typically has a bandwidth extending into the tens, and preferably hundreds, of Mbps, in order to provide video services, such as high-quality interactive video transmissions, over a single wideband channel.

According to one aspect of the invention, the communication network is structured as follows. It comprises a plurality of communication links, and a wideband channel switching apparatus and a narrowband channel switching apparatus coupled to the links and operable for establishing switched wideband and narrowband channels, respectively, on the links. The network also comprises a control apparatus responsive to signaling messages received on the links for effecting operation of the switching apparatuses and sending signaling messages over the links to effect establishment of communication paths over the channels through the switching apparatuses. The network further comprises a control communication medium, such as a high-speed bus, that interconnects the switching apparatuses with the control apparatus and communicates control signals among them for controlling establishment of the channels. Also included is a signaling message transfer apparatus that receives messages from the links and communicates these to the control apparatus, and further receives signaling messages from the control apparatus and communicates these to the links. The message transfer apparatus receives messages from the control apparatus, and communicates messages to the control apparatus, over the control communication medium. Furthermore, the message transfer apparatus receives messages from the links, and communicates messages to the links, through the narrowband switch.

The communication network is intended for use in providing integrated voice, data, and video services between a plurality of pieces of equipment, located at or near subscriber premises. The pieces are connected to the network by the channelized links. Preferably, each piece of equipment is connected to the network by a set of links comprising at least one link and providing a set of wideband communication channels comprising at least one wideband channel, and a set of narrowband communication channels comprising at least one narrowband channel. A narrowband channel of each link set carries signaling messages for establishing communication connections over all channels of the link set.

Preferably, the wideband and narrowband switching apparatuses are digital channel switching apparatuses. The wideband switching apparatus interconnects wideband channels to establish wideband communication paths between pieces of equipment, and the narrowband switching apparatus interconnects narrowband channels to establish narrowband communication paths between pieces of equipment. The control apparatus responds to signaling messages that it receives from the pieces of equipment, and sends control communications to the wideband and the narrowband switching apparatuses over the control communication medium and also sends signaling messages to the pieces of equipment, thereby to control establishment on the channels of wideband and narrowband communication paths between the pieces of equipment.

The signaling message transfer apparatus has the signaling-message-carrying narrowband channels coupled thereto by the narrowband switching apparatus. The transfer apparatus transfers signaling messages incoming from the pieces of equipment, on the coupled channels, to the control apparatus, over the control communication medium. It also transfers signaling messages incoming from the control apparatus, over the control communication medium, to the pieces of equipment, on the coupled channels.

Illustratively, a continuous stream of signals is present on each signaling-message-carrying narrowband channel. In the incoming direction, the transfer apparatus monitors the signaling stream for signals that make up signaling messages, extracts these from the stream and saves them (illustratively discarding other incoming signals, such as idle code), reassembles signaling messages from the saved signals, and sends the reassembled messages to the node control apparatus. In the outgoing direction, the transfer apparatus generates a continuous signal stream on the narrowband channels. It disassembles signaling messages that it receives from the node control apparatus into their constituent signals, and sends the signals out on the appropriate signaling-message-carrying channels. When it has no message signals to send, the transfer apparatus generates and sends out signals such as idle code on the signaling channels.

Preferably, a plurality of signaling-message-carrying channels are serviced on a rotating basis by common circuitry of the transfer apparatus. The common circuitry comprises a finite state machine having logic circuitry whose use is shared by the plurality of channels, and a memory coupled to the logic which saves the current state for each channel. When the common circuitry is preparing to service a particular channel, that channel's saved current state is used to properly configure the logic circuitry. When the common circuitry has finished serving a channel, the channel's new current state, computed by the logic circuitry, is stored in the memory in place of the channel's previous stored current state.

According to another aspect of the invention, a network for providing integrated voice, data, and video services between a plurality of pieces of equipment that are each connected to the network by a set of channelized first links that provide wideband and narrowband channels, including a narrowband first channel for carrying signaling messages, is structured as follows. It includes a wideband switch for interconnecting wideband channels, a narrowband switch for interconnecting narrowband channels, and a plurality of channelized second links that couple link sets to the wideband and narrowband switches and provide a plurality of second communication channels for extending wideband and narrowband channels to the switches. The network also includes a wideband channel handler interposed between first and second links for connecting wideband channels with second channels, and a narrowband channel handler interposed between first and second links for connecting narrowband channels with second channels. The switches and handlers are for establishing wideband and narrowband communication paths to and from the pieces of equipment. The network further includes a controller connected at least to the switches and coupled to the message carrying narrowband channels and responsive to signaling messages received from pieces of equipment on the coupled channels for sending control communications to the switches and sending signaling messages to pieces of equipment on the coupled channels to control establishment on the wideband and narrowband channels of communication paths.

Preferably, the communication network for providing integrated voice, data, and video services comprises a central switching node for establishing wideband and narrowband communication connections between a plurality of pieces of equipment that are communicatively connected thereto, a plurality of peripheral, or "remote", nodes each for communicatively coupling a plurality of the pieces of equipment to the central node, and a plurality of optical fibers that connect the pieces of equipment and the central node with the remote nodes and that carry both wideband and narrowband communications therebetween. Each piece of equipment is connected to a remote node by a set of first optical fibers comprising at least one optical fiber. Different equipment pieces may be connected to different remote nodes, or to the same remote node by different first fiber sets. The first fiber set provides a set of wideband communication channels comprising at least one wideband channel, and a set of narrowband communication channels comprising at least one narrowband channel. A narrowband channel of the narrowband set carries signaling messages for establishing communication connections over all channels of the first fiber set. Each remote node is connected to the central node by its own set of second optical fibers comprising at least one second fiber. The second fiber set provides a plurality of second communication channels for carrying the wideband and the narrowband channels.

Each remote node includes a wideband digital channel handling fabric and a narrowband digital channel handling fabric. Both fabrics are coupled to first fibers of first fiber sets that are connected to the remote node and to second fibers of the remote node's second fiber set. The wideband fabric connects wideband channels with second channels to establish wideband communication paths between the central node and pieces of equipment connected to the remote node. The narrowband fabric connects narrowband channels with second channels to establish narrowband communication paths between the central node and pieces of equipment connected to the remote node.

The central node comprises a wideband digital channel switch and a narrowband digital channel switch, both of which are coupled to second fibers of the second fiber sets. The wideband switch interconnects wideband channels carried by the second channels, to establish wideband communication paths between pieces of equipment. And the narrowband switch interconnects narrowband channels carried by the second channels, to establish narrowband communication paths between pieces of equipment. Coupled to the wideband and the narrowband switches is a node control apparatus. The node control apparatus responds to signaling messages received from the pieces of equipment on the signaling-message-carrying narrowband channels by sending control communications to the wideband switch and to the narrowband switch, and by sending signaling messages to the pieces of equipment on the signaling-message-carrying narrowband channels, to control establishment of wideband and narrowband communication paths on the wideband and the narrowband channels between the pieces of equipment.

Preferably, the operation of the remote node is under control of the central node. The wideband fabric in each remote node is coupled to the control apparatus in the central node. The control apparatus is further responsive to the received signaling messages by sending control communications to the wideband fabric to control establishment thereby of wideband communication paths. The narrowband fabric is typically a narrowband digital channel multiplexer and demultiplexer for multiplexing a plurality of narrowband channels into a second channel and demultiplexing a second channel into a plurality of narrowband first channels. Establishment thereby of narrowband communication paths typically does not require control by the node control apparatus.

In an illustrative embodiment, the network is configured to provide integrated voice, data, and video services between a plurality of interface arrangements, each for communicatively coupling one or more subscriber communication devices to the network. The network comprises a central switching node for establishing wideband and narrowband communication connections between the interface arrangements, and a plurality of remote nodes each communicatively coupling a plurality of the interface arrangements to the central node.

A plurality of distribution optical fibers communicatively connect the interface arrangements with the remote nodes. Each interface arrangement is connected with one remote node by its own set of distribution fibers that comprises at least one distribution fiber. Each distribution fiber set defines a set of wideband and a set of narrowband first communication channels, each set comprising at least one channel. A narrowband first channel of each fiber set carries signaling messages for establishing communication connections over all channels of the fiber set.

A plurality of feeder optical fibers communicatively connect the remote nodes with the central node. Each remote node is connected with the central node by its own set of second fibers that comprises at least one feeder fiber. Each feeder fiber set defines a plurality of wideband-carrying channels each comprising at least one wideband second channel, and at least one narrowband-carrying channel each comprising a plurality of narrowband second channels.

A remote node comprises a remote wideband digital channel switch and a narrowband digital channel multiplexer and demultiplexer. Both are coupled to fibers of the remote node's feeder fiber set and to fibers of the distribution fiber sets that are connected to the remote node. The remote wideband switch responds to control communications received from the central node and connects wideband first channels with wideband second channels, to establish wideband communication paths between the central node and the interface arrangements connected to the remote node. The multiplexer and demultiplexer connects the channels of a plurality of narrowband first channel sets with the second channels of a narrowband-carrying channel, to establish narrowband communication paths between the central node and the interface arrangements connected to the remote node.

The central node comprises a central wideband digital channel switch and a narrowband digital channel switch. Both are coupled to fibers of the feeder fiber sets. The wideband switch responds to received control communications by interconnecting wideband second channels, to establish wideband communication paths between interface arrangements. The narrowband switch responds to received control communications by interconnecting narrowband second channels, to establish narrowband communication paths between interface arrangements. The central node also includes a central node control apparatus that responds to signaling messages that it receives from the interface arrangements, by sending control communications to the remote and central wideband switches and the narrowband switch, and by sending signaling messages to the interface arrangements. The central node control apparatus thereby controls establishment of wideband and narrowband communication paths between the interface arrangements on the channels of the distribution and feeder fibers.

A control communication medium, illustratively a high-speed bus, interconnects the remote and central wideband switches and the narrowband switch with the central node control apparatus and carries control communications therebetween.

The central node further includes a signaling message transfer arrangements that is connected to the bus. Second channels that are connected to signaling-message-carrying narrowband first channels are coupled to the transfer arrangement by the narrowband switch. The transfer arrangement transfers signaling messages that are incoming from the interface arrangements, on the coupled channels, to the node control apparatus, over the bus. The transfer arrangement also transfers signaling messages that are incoming from the node control arrangement, over the bus, to the interface arrangements, on the coupled channels.

The above-described network provides numerous benefits in addition to providing universal information services as described above.

The network moves, processes, and switches all information digitally, thereby obtaining benefits not available in the analog domain, such as a high signal-to-noise ratio, resistance to crosstalk and other interference, and ease of encryption, multiplexing, and signal regeneration. Furthermore, conversion is eliminated between the analog and digital domains at points where switching and transmission facilities interface.

Use of remote nodes to perform narrowband multiplexing and demultiplexing and certain wideband switching functions minimizes the facilities—in particular the numbers of fibers—that must connect to the central node. Yet all switching is done under control of the central node control arrangement, thereby minimizing active electronics in the outside plant. All this leads to a simple, efficient, and easily maintainable network configuration.

Use of a signaling message transfer arrangement to communicate signaling messages to and from the node control apparatus over the control bus simplifies the structure and functions of the node control apparatus. It further enables the node control apparatus to operate more efficiently and quickly than it would otherwise, thereby improving the speed of response to subscriber service requests and speed of provision of services to subscribers by the network. And sharing of transfer arrangement circuitry by a plurality of signaling-message-carrying channels decreases substantially the amount of circuitry required to serve those channels and hence decreases the cost of the network.

Use of message, as opposed to stimulus, signaling, as well as the use of a single channel to carry all signaling to and from a subscriber in each direction, provides maximum network extensibility and minimization of control software. This form of signaling, along with preferably defining the narrowband channels to be 64 Kbps digital channels yet allowing narrowband channels to be integral sub-multiples of the 64 Kbps rate and allowing a plurality of the channels to be used in aggregate to provide service at higher than single channel rates, make the system fully flexible yet compatible with developing international ISDN standards.

Use of fiber optic transport facilities minimizes the amount of outside plant electronics, particularly because it provides for repeaterless connections both between the central node and the remote nodes and between the remote nodes and the subscribers. It also facilitates certain channel multiplexing techniques. Indeed, preferably each distribution and each feeder fiber carries a plurality of wavelengths each defining at least one first and second channel, respectively, whereby first and second channels are wavelength-division multiplexed on the feeder and distribution fibers, respectively. Wavelength-division multiplexing provides extensible, i.e., open ended, transparent wideband channel bandwidth for support of future services that will likely require more bandwidth than today's services, such as high-definition television (HDTV). Furthermore, a plurality of channels is selectively time-division multiplexed onto a single wavelength. Time-division multiplexing increases the channel-carrying capacity of a fiber, and thus allows for use of fewer fibers and associated electronics, thereby reducing the cost of the network.

Preferably, the wideband channels are pulse-code, differential pulse-code, or pulse-analog modulated, and the wideband switches are space division digital switches. Pulse-code and differential-pulse code modulation techniques are very resistant to signal mutilation, yet efficient in terms of required digital transmission rates. Pulse-analog (for example, pulse-frequency) modulation is less costly to implement than the pulse-code modulation techniques, yet it is still compatible with the space division digital switches. Transport of signals in a modulation format that is compatible with the signal switches eliminates the need for format conversion and hence provides for ease and low cost of interfacing between the transport and switching facilities. Digital space division switches, because they are digital switches, are suited for binary modulation techniques like pulse-code and pulse-analog modulation. And because they are space division switches, they accommodate channel bandwidth extension that future services may require. Furthermore, they handle variable speed channels, they allow for channel fan-out for broadcast transmissions, and they regenerate signals passing therethrough.

These and other advantages and features of the present invention will become apparent from the following description of an illustrative embodiment of the invention, taken together, with the drawing.

DETAILED DESCRIPTION

TABLE OF CONTENTS

Figure 13:
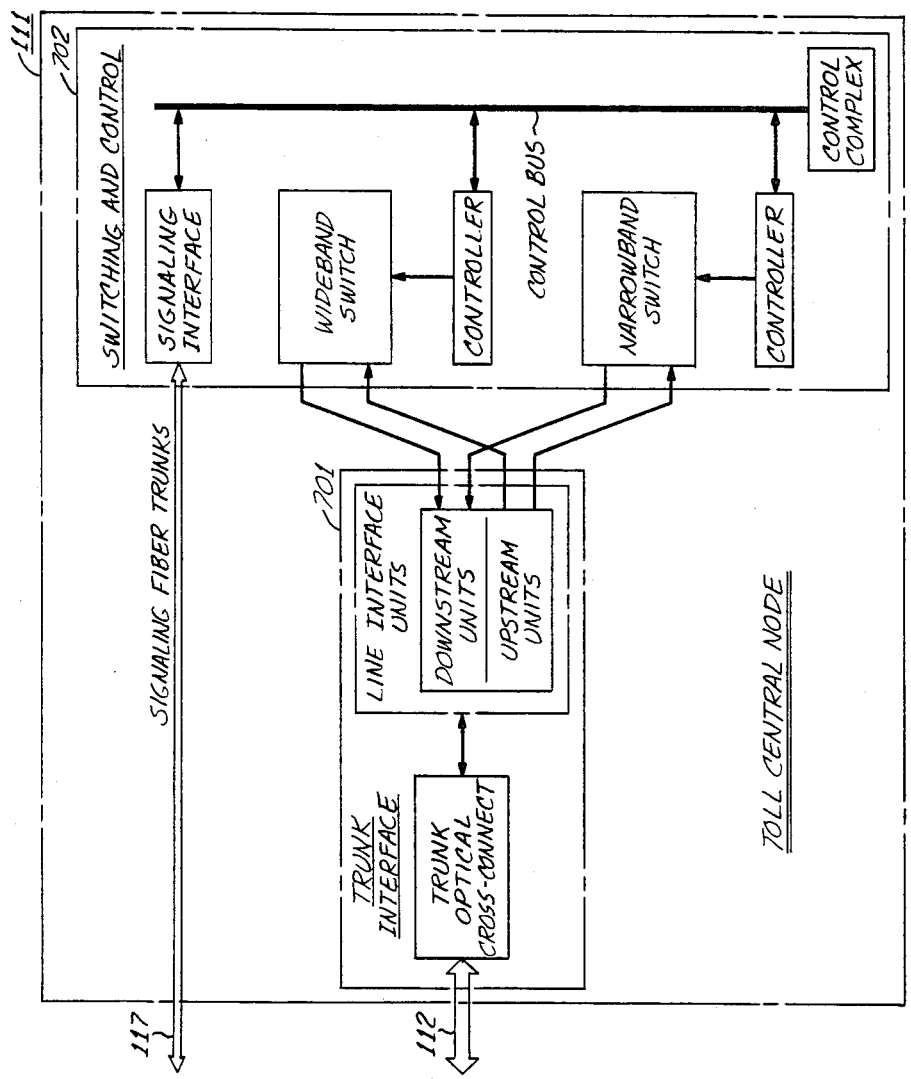
FIG. 13 is a block diagram of a toll central node of FIGS. 1 and 2.
Figure 14:
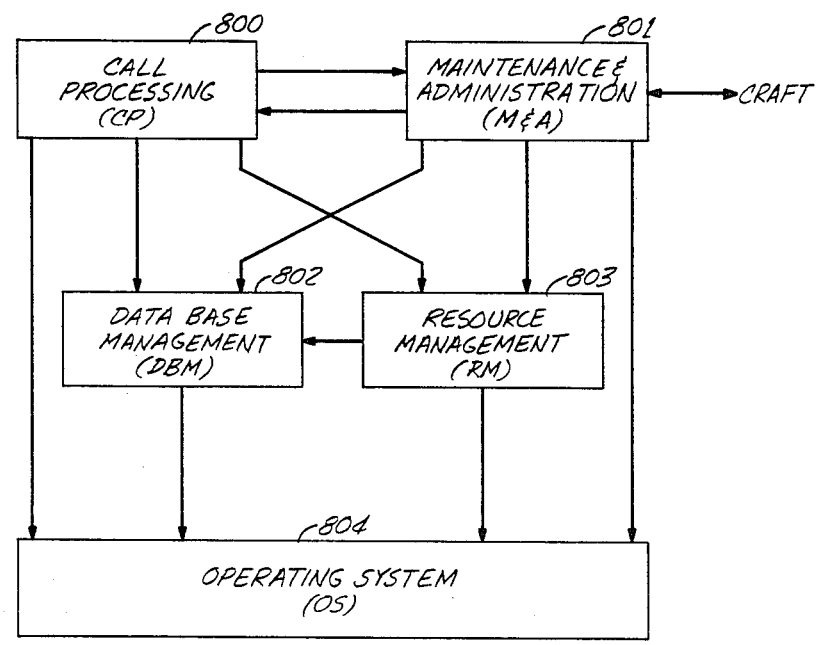
FIG. 14 is a block diagram of software of the control complex of a central node of FIGS. 1 and 2.
Figure 15:
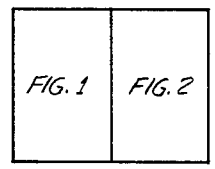
FIG. 15 shows the arrangement of FIGS. 1 and 2 to form the network architecture.

System Overview (FIGS. 1 and 2)
Distribution Fibers - Channelization (FIGS. 3, 4, and 5)
  Feeder Fibers - Channelization (FIGS. 6 and 7)
  Communication and Signaling Trunks
  Subscriber Premises Equipment (FIG. 8)
  Remote Node (FIG. 9)
  Local Central Node (FIG. 10)
  Subscriber Signaling Subsystem (FIGS. 11 and 12)
  External Interface (FIG. 10)
  Toll Central Node (FIG. 13)
  Control Software
Subscriber Interface Equipment
Central Node (FIG. 14)

Figure 1:
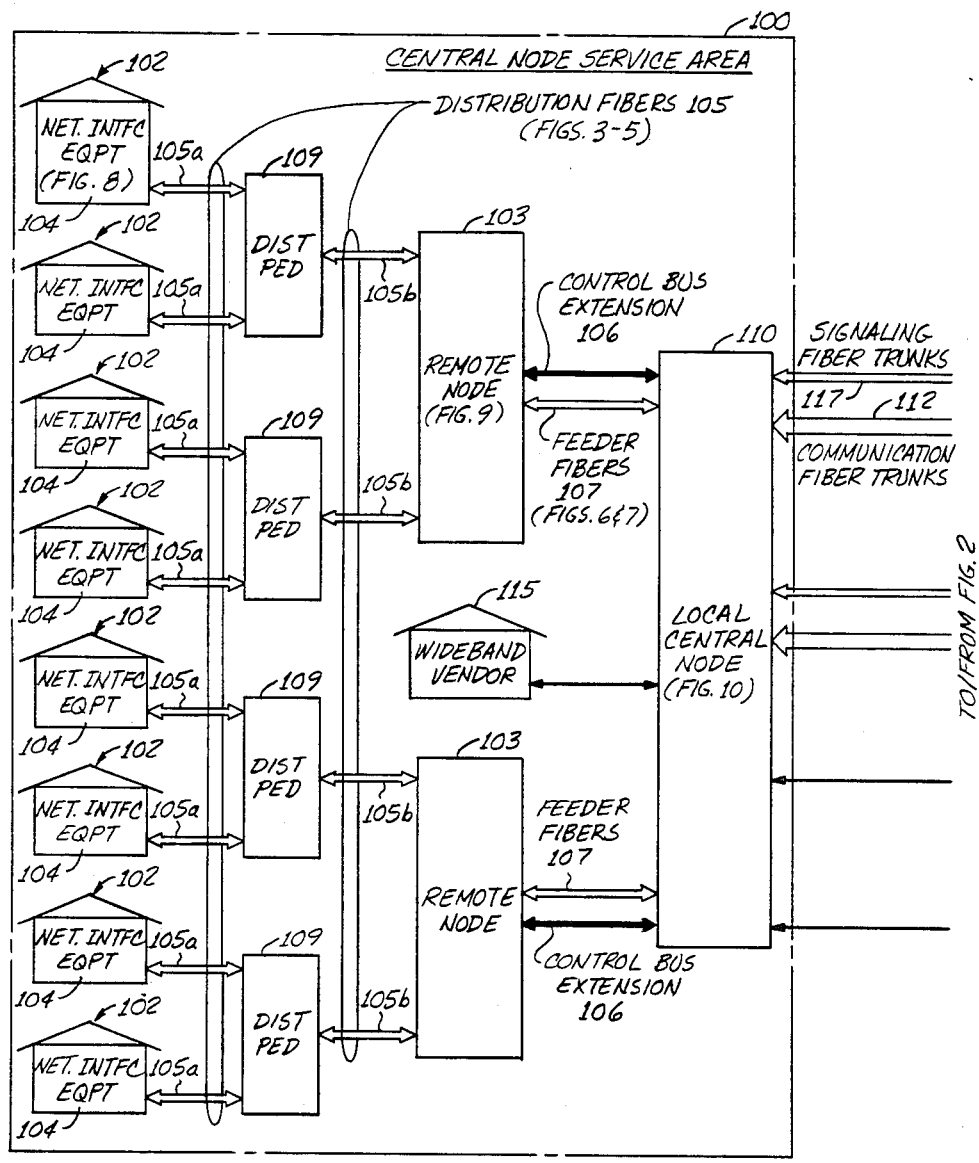
FIGS. 1 and 2 are a block diagram of a switched integrated wideband and narrowband multiservices network that embodies an illustrative example of the invention.
Figure 2:
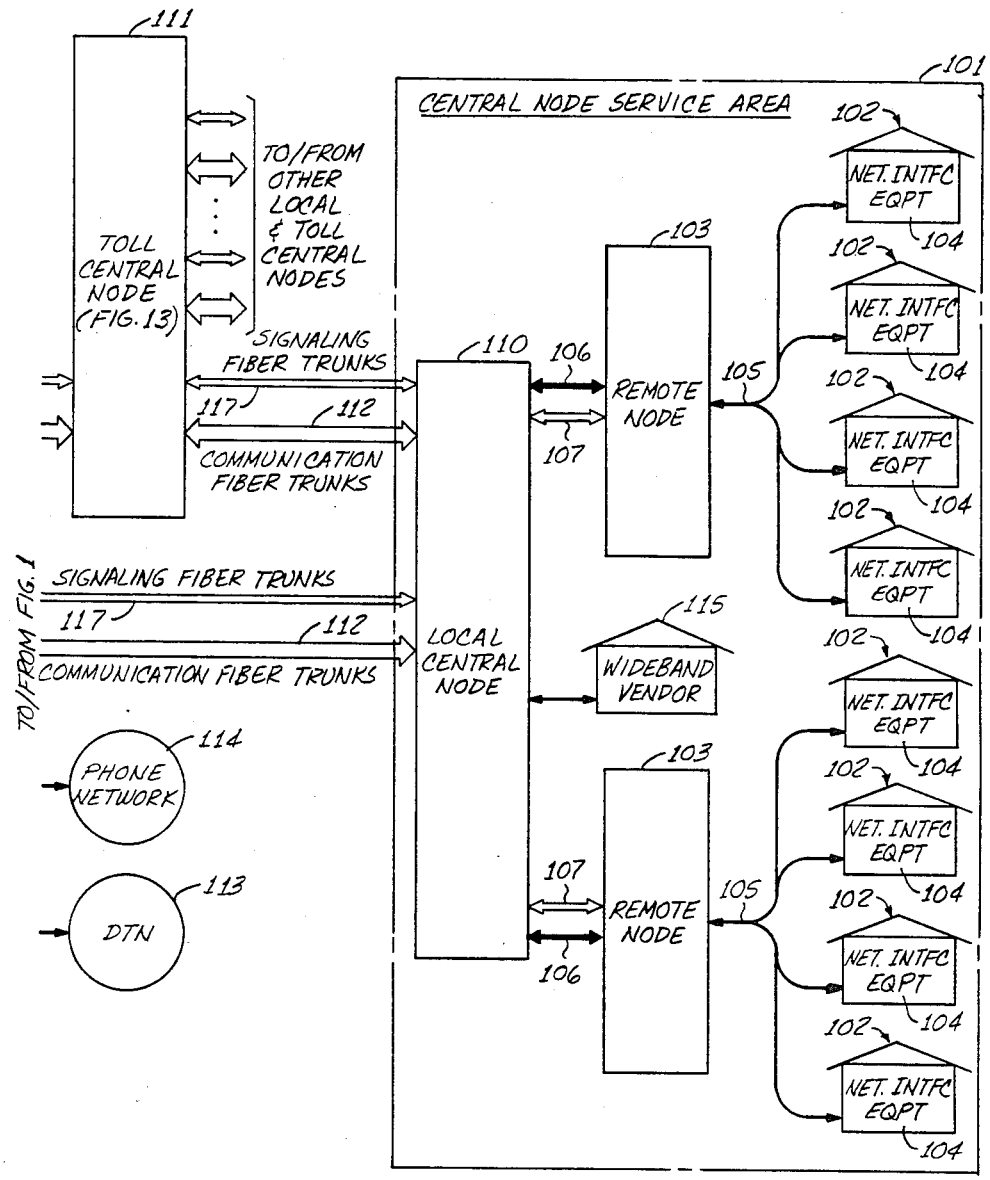

SYSTEM OVERVIEW (FIGS. 1 and 2)

FIGS. 1 and 2 together portray a switched integrated wideband and narrowband multiservices digital network. The geographical area served by the network is divided into a plurality of central node service areas 100 and 101. Illustratively, a service area 100 or 101 encompasses on the order of 100,000 subscribers. However, the size of a area 100 or 101 may vary greatly and may encompass significantly fewer subscribers, or conversely up to about one million subscribers.

Communication services in each service area 100 and 101 are provided by a local central node 110, and by equipment subtending node 110. Node 110 along with its subtending equipment directly serves the communication needs of subscribers 102 located in that service area. A subscriber 102 may be, for example, a residential customer, a business customer, or a communication service vendor. Such vendors are, for example, database information providers, on-line shopping and banking service providers, motion video (CATV-like) and other entertainment service providers, and telemetry service providers.

Equipment subtending a central node 110 comprises a plurality of remote switching and control nodes 103, each of which serves a zone comprising a plurality of subtending subscribers 102. Node 103 typically provides certain limited switching functions for its subscribers 102, and for the sharing by subscribers 102 of transmission facilities extending to node 110. A node 103 is connected via distribution optical fibers 105 (each comprising two segments 105a and 105b joined by a distribution pedestal 109) to network interface equipment 104 located at the premises of subscribers 102.

Illustratively, a remote node 103 serves a zone including on the order of about 500 subscribers 102, or a zone extending for a few kilometers away from node 103. However, the size of a zone typically varies greatly from zone to zone, both in terms of geographical extent and the number of subscribers 102 included therein. The size of a zone is generally determined by economic considerations, such as the cost of extending services from node 103 to more, and more distant, subscribers 102 versus the cost of providing an additional node 103 for those subscribers 102. A node 103 is typically located distantly from node 110, for example in the midst of the zone that it serves and up to 10 to 15 kilometers away from node 110. Alternatively, a node 103 is co-located with node 110, outside of the zone that it serves, and merely is connected to subscribers 102 via transmission facilities. This choice is, once again, generally governed by cost considerations. However, a node 103 is typically within 5 kms of its subscribers 102, and generally is no more than about 10 kms away.

Alternatively, in certain situations, such as when a particular group of subscribers 102 are such high-volume network users that sharing of transmission facilities between them is not cost-justified, a node 103 is not used and subscribers 102 are served by node 110 directly. This latter scenario is particularly applicable to those who are communication service vendors, for example wideband service vendors 115 such as video (TV) providers. Such vendors 115 typically have a direct optical fiber connection to node 110 without intermediacy of node 103, as illustrated in FIGS. 1 and 2.

The fibers 105, which connect node 103 with subscribers 102, typically are the subscribers' private transport facilities, carrying communications to and from a subscriber's premises. (Alternatively, a plurality of subscribers may share use of network interface equipment, and hence share use of fibers 105 connected to that equipment. This arrangement is not shown in FIG. 8.) A plurality of fibers 105 are provided for each subscriber, but generally not all are used at any one time for a typical subscriber 102. The remaining, unused, fibers are provided to serve as replacements in case of breakage of active fibers 105. The remaining fibers may also be used for future service expansion.

Typically, a residence subscriber 102 is provided with just a few active fibers 105. The number of active fibers 105 provided to business subscribers and to communication service vendors varies and depends upon the transmission capacity required by them.

Depending upon the particular implementation, a fiber 105 may be used to conduct communications in only one, or in both, directions. For example, communications on a fiber 105 may proceed in a simplex manner: one fiber 105 is used to conduct communications downstream, i.e., from node 103 to the subscriber's premises, while another fiber 105 is used to conduct communications upstream, i.e., from the subscriber's premises to node 103. Or, communications on a fiber 105 may proceed in a half-duplex manner: one fiber 105 is used to conduct both upstream and downstream communications, but each during different alternating time periods. Alternatively, communications on a fiber 105 may proceed in a full duplex manner: one fiber 105 is used to conduct both upstream and downstream communications at the same time, but on different wavelengths. Or any combination of these methods may be used.

Each fiber 105 is typically implemented in two portions 105a and 105b which are coupled together at a distribution pedestal 109. Each pedestal 109 serves as a distribution fiber drop for a group of subscribers 102 of a zone served by a remote node 103. A group for subscribers may consist of, for example, a suburban or city block, or an apartment or office building. Pedestals 109 allow for cost-effective cabling, in that fiber sheathing costs can be shared over portions 105b of the distribution fibers that extend between remote node 103 and pedestal 109. Pedestals 109 also provide a convenient termination point for distribution fibers intended for potential customers who have not yet subscribed to the network, or whose premises have not yet been constructed. For these potential subscribers, only portions 105b of the distribution fibers typically exist. Since pedestals 109 are passive devices and serve no operational purpose in the architecture of the network once a subscriber is connected to the network, subsequent discussion ignores their existence.

All fibers 105 terminate at remote nodes 103. The primary functions of such nodes 103 include multiplexing and demultiplexing of narrowband communications, distribution of multi-point (broadcast and narrowcast) wideband communications, and channel changing (for example, of TV channels) for subscribers. Each node 103 of an area 100 is connected by feeder optical fibers 107 and by a control bus extension 106 to local central node 110 that serves that area 100 or 101. The number of fibers 107 interconnecting node 103 and 110 varies from remote node to remote node and depends upon the size of the remote node (i.e., how many subscribers 102 it serves) and the mix of customer traffic (for example, how many of the subscribers 102 are video vendors). Generally, 10 to 15 fibers 107 interconnect a central and a remote node. As in the case of fibers 105, a fiber 107 may be used to conduct communications in only one, or in both, directions. Each fiber 107 provides a highly multiplexed stream of communication channels.

Control bus extension 106 is also implemented as an optical fiber. Extension 106 carries remote node control, administration, and maintenance information between remote and central nodes 103 and 110.

A local central node 110 is the control point of an area 100 or 101. Node 110 comprises the equipment for interconnecting remote nodes 103 that subtend it, for billing and administration, and for providing communication access to area 100 or 101 that it serves from outside of that area. (Alternatively, two or more "small" central nodes 110 i.e., each serving a relatively small number of subscribers 102, may share equipment (not shown) for providing billing and administrative functions. In such a configuration, the equipment is located in one central node 110 and other central nodes 110 are connected thereto by control bus extensions (not shown), in the manner of remote nodes 103.) Trunking facilities interconnect local central node 110 with other parts of the network (such as with local central nodes 110 of other central node service areas). And interface facilities couple central node 110 to existing circuit and packet voice and data transport facilities (such as a telephone network 114 and a data transport network 113).

Optionally, there is in the network of FIGS. 1 and 2 a hierarchy of toll central nodes which interconnect, via trunking facilities, local central nodes 110. This hierarchy is represented in FIGS. 1 and 2 by a toll central node 111 which interconnects nodes 110 of areas 100 and 101. Illustratively, the functionality of toll central node 111 parallels that of a telephony class 4 office. Interconnection between nodes 110 and 111 is by optical fiber communication trunks 112, and by signaling trunks 117, also implemented as optical fibers, which are illustratively common channel interoffice signaling (CCIS) trunks.

Distribution fibers 105 and feeder fibers 107 provide the physical transport for communications throughout the network. Individual communications are carried by communication channels defined on fibers 105 and 107. A fiber 105 or 107 may define one or more channels. For purposes of discussion of the network of FIGS. 1 and 2, the term "channel" refers to a simplex, i.e., a unidirectional, channel. A duplex, i.e., a bidirectional, channel therefore comprises two simplex channels, one for each direction of transmission.

Any suitable multiplexing technique, or combination of techniques, may be used to multiplex a plurality of channels onto a fiber 105 or 107. Three examples of channelization schemes suitable for fibers 105 are presented in FIGS. 3, 4, and 5, and two examples for feeder fibers 107 are presented in FIGS. 6 and 7.

Figure 3:
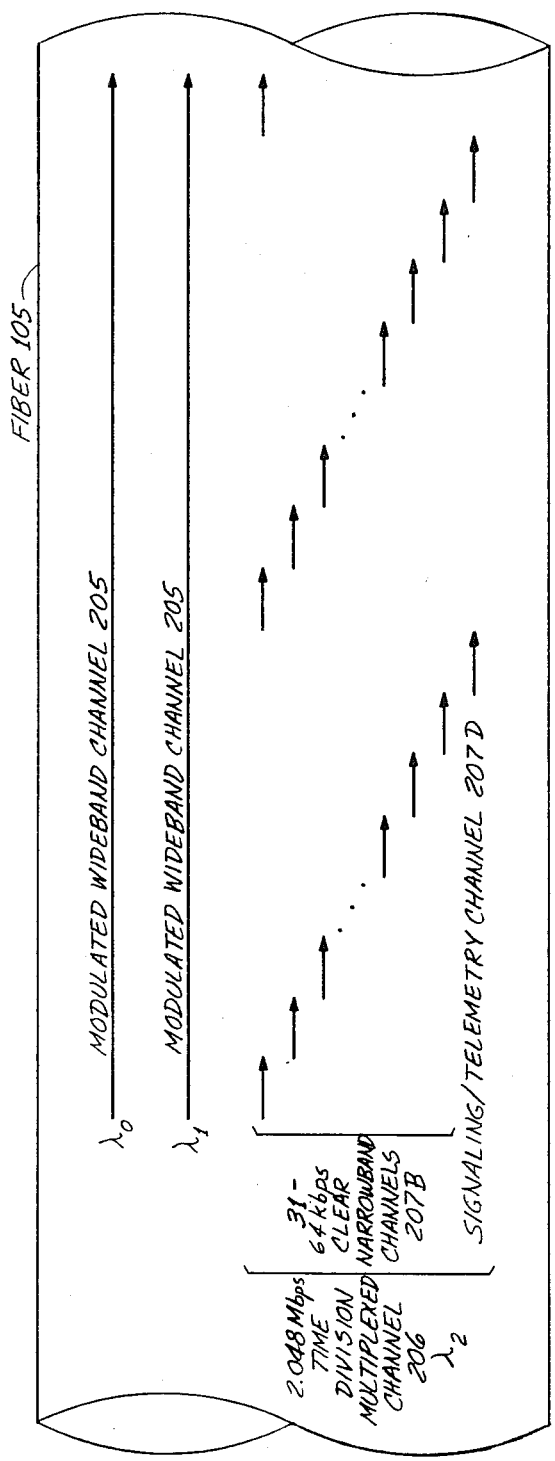
FIG. 3 is a representation of communication channels on a distribution fiber of FIGS. 1 and 2.
Figure 4:
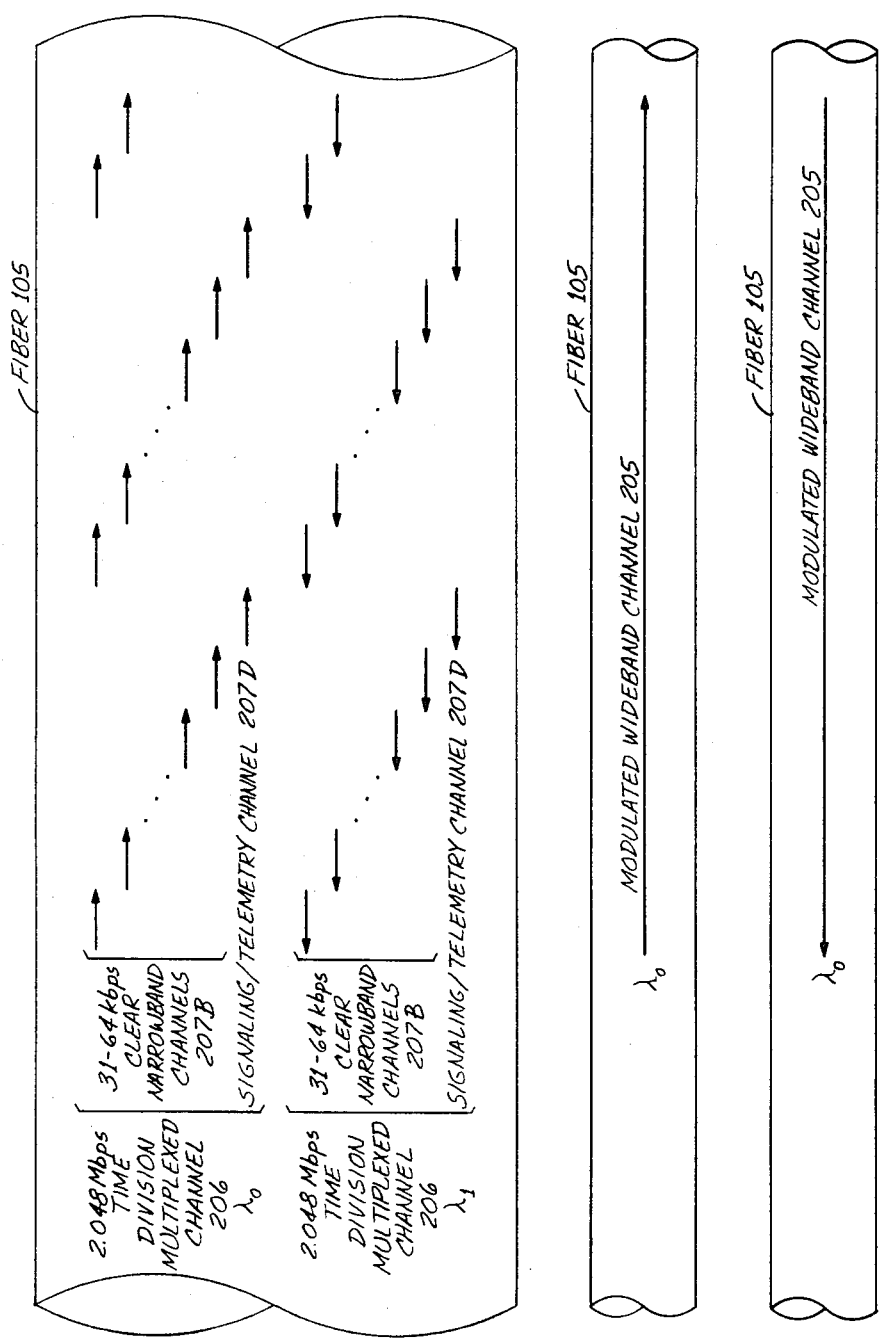
FIG. 4 is a representation of alternative communication channels on a distribution fiber of FIGS. 1 and 2.
Figure 5:
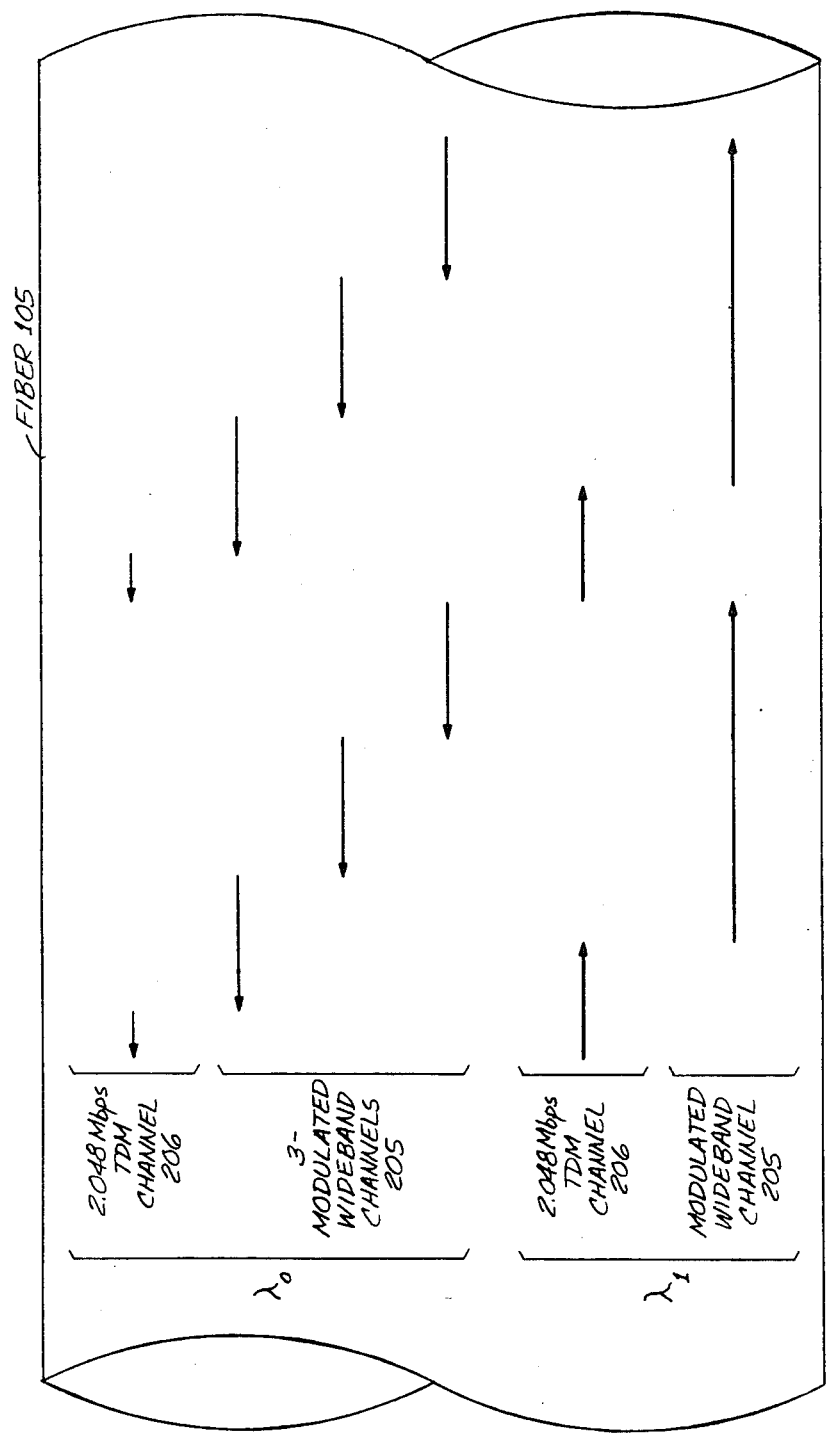
FIG. 5 is a representation of other alternative communication channels on a distribution fiber of FIGS. 1 and 2.

DISTRIBUTION FIBERS-CHANNELIZATION
(FIGS. 3, 4, and 5)

FIG. 3 illustrates a 1 on a wavelength-division multiplexing arrangement of a simplex fiber 105, i.e., one conducting communications in one direction of transmission only. In order to have full two-way communication capability, a subscriber requires at least two such active fibers 105, one for each direction of transmission.

The fiber 105 in FIG. 3 supports two digital wideband channels 205 and thirty-two narrowband channels 207 (comprising channels 207B and 207D). Illustratively, channels 205 are digital video or very high-speed (greater than about 2 Mbps) data channels, and channels 207 are 64 Kbps digital voice and data channels. Fiber 105 is wavelength-division multiplexed and carries three wavelengths. Two wavelengths $\lambda_0$ and $\lambda_1$ are used for the two wideband channels 205. Each channel 205 is implemented as a modulated signal stream carried by a single wavelength. The modulation of the wideband channel signal stream may be pulse-analog modulation (PAM), such as pulse-frequency modulation (PFM), but is preferably pulse-code modulation (PCM) and most preferably is differential pulse-code modulation (DPCM). The third wavelength $\lambda_2$ is used for the thirty-two 64 Kbps narrowband channels 207 which are implemented as a 2.048 Mbps time-division-multiplexed (TDM) digital channel 206.

For clarity and ease of reference, a channel comprising one, or a plurality of multiplexed, wideband channels 205 will be referred to as a "video" channel, and a channel comprising one, or a plurality of multiplexed, narrowband channels 207 will be referred to as a "voice and data" channel, irrespective of what information they actually may carry. For example, a wideband channel 205 is also referred to as a video channel 205, no matter what information it may be carrying, and a channel 206 is referred to as a voice and data channel, irrespective of what information its constituent narrowband channels 207 may be carrying.

The thirty-two 64 Kbps digital channels 207 include one message signaling and telemetry channel 207D and 31 clear channels 207B. (By "clear" is meant that a channel 207B provides a full 64 Kbps of bandwidth for subscriber transmissions, without reserving a portion of the channel bandwidth for network control signaling.) Channel 207D corresponds to the ISDN D channel as defined in the ISDN standards presently proposed by the CCITT. Signaling and telemetry message transfers on channel 207D are in packet form and preferably follow the LAP D protocol of the CCITT ISDN proposal. In this example, signaling and telemetry messages are statistically multiplexed on channel 207D. Channel 207D is used to carry all control information between a subscriber 102 and a central node 110 for establishing communications, in particular for establishing communications over channels 205 and 207B.

Alternatively, channel 207D is dedicated to carrying signaling messages. In that case, telemetry messages are carried by one of the channels 207B. That channel 207B is optionally dedicated to providing the telemetry services.

Clear channels 207B correspond to the ISDN B channels as defined in the current ISDN standards of the CCITT. Channels 207B are switched within the network of FIGS. 1 and 2 either individually, to provide up to 31 independent simultaneous voice or data calls, or in an aggregate of any desired number of channels, to provide service at higher than 64 Kbps rates. For example, 24 channels are switchable in aggregate to provide standard 1.5 Mbps service. When some of the channels 207B are switched in aggregate mode, other channels 207B are selectively switched individually.

Packetized information, except for telemetry data carried on channel 207D, is generally carried through the network by channels 207B as clear-channel 64 Kbps circuits, and is statistically multiplexed only prior to leaving the central node service area, at local central node 110. Video is generally switched and transmitted through the network either in digital pulse-analog modulated form at a rate of 12 to 25 million pulses per second (Mpps), or in PCM or DPCM form at 90 Mbps or 45 Mbps, respectively. Video channels 205 are transparent space-division circuits. Hence, they are extendable in the future to higher speeds to support services requiring even higher transmission bandwidths.

FIG. 4 illustrates a channelization scheme of fibers 105 that involves a mix of full duplex fibers 105, i.e., ones conducting communications simultaneously in both directions of transmission, and simplex fibers 105. A duplex fiber 105 is wavelength-division multiplexed and carries two wavelengths simultaneously, one in each direction. These wavelengths are used to carry upstream and downstream voice and data channels 206, defined in conjunction with FIG. 3.

In the example of FIG. 4, separate simplex fibers 105 are used for video channels 205, one fiber 105 for each channel 205. Fibers 105 that carry video channels 205 are not wavelength-division multiplexed: each carries one wavelength which is the same for all of these fibers 105. Each channel 205 is implemented as a modulated signal stream carried by a single wavelength. The modulation of the wideband channel signal stream is assumed to be pulse-analog modulation: if PCM or DPCM were used, it would be preferable to wavelength-division multiplex channels 205 onto a single fiber 105 to minimize the number of fibers 105.

The arrangement of FIG. 4 is not as efficient as that described for FIG. 3, in that it requires a greater number of fibers to define the same number of channels. However, it does have certain advantages, hereinafter described (see p. 33).

Yet another channelization scheme that may be implemented on fibers 105 is shown in FIG. 5. In that example, a single fiber 105 is wavelength-division and time-division multiplexed to carry all channels 205 and 206 between a subscriber 102 and a remote node 103. Such a fiber 105 is wavelength-division multiplexed to carry two wavelengths simultaneously, one in each direction. All downstream channels are time-division multiplexed onto the downstream wavelength and all upstream channels are time-division multiplexed onto the upstream wavelength. In the downstream direction, there are three digital video channels 205 each implemented as a 45 Mbps DPCM-encoded signal stream, and voice and data channel 206 comprising the thirty-two downstream digital narrowband channels 207. The three channels 205 and one channel 206 are time-division multiplexed on the downstream wavelength. In the upstream direction, there is one digital video channel 205 comprising a 45 Mbps DPCM stream, and a voice and data channel 206, time division multiplexed on a wavelength. Fewer wideband channels are provided in this example in the upstream than in the downstream direction because it is expected that a typical subscriber 102 is predominantly a consumer rather than a creator of wideband services.

A similar multiplexing arrangement (not shown) to that just described may be used for a half-duplex fiber 105, the difference being that only one wavelength periodically alternating in direction is carried by fiber 105, and time-compression multiplexing techniques are used to multiplex both upstream and downstream channels onto the wavelength during alternate time periods.

FEEDER FIBERS-CHANNELIZATION (FIGS. 6 AND 7)

At remote nodes 103, channels 205 and 206 of fibers 105 are interfaced to channels of feeder fibers 107. Fibers 107 and their channels are more highly multiplexed than fibers 105, to make more efficient use of the transport capacity of fibers 107 and thereby minimize the number of fibers 107 interconnecting nodes 103 and 110.

As was the case with the distribution fibers 105, so, too, any suitable multiplexing technique, or combination of techniques, may be used to multiplex a plurality of channels onto a fiber 107. Two sample embodiments of multiplexed feeder fibers 107 are graphically illustrated in FIGS. 6 and 7.

Figure 6:
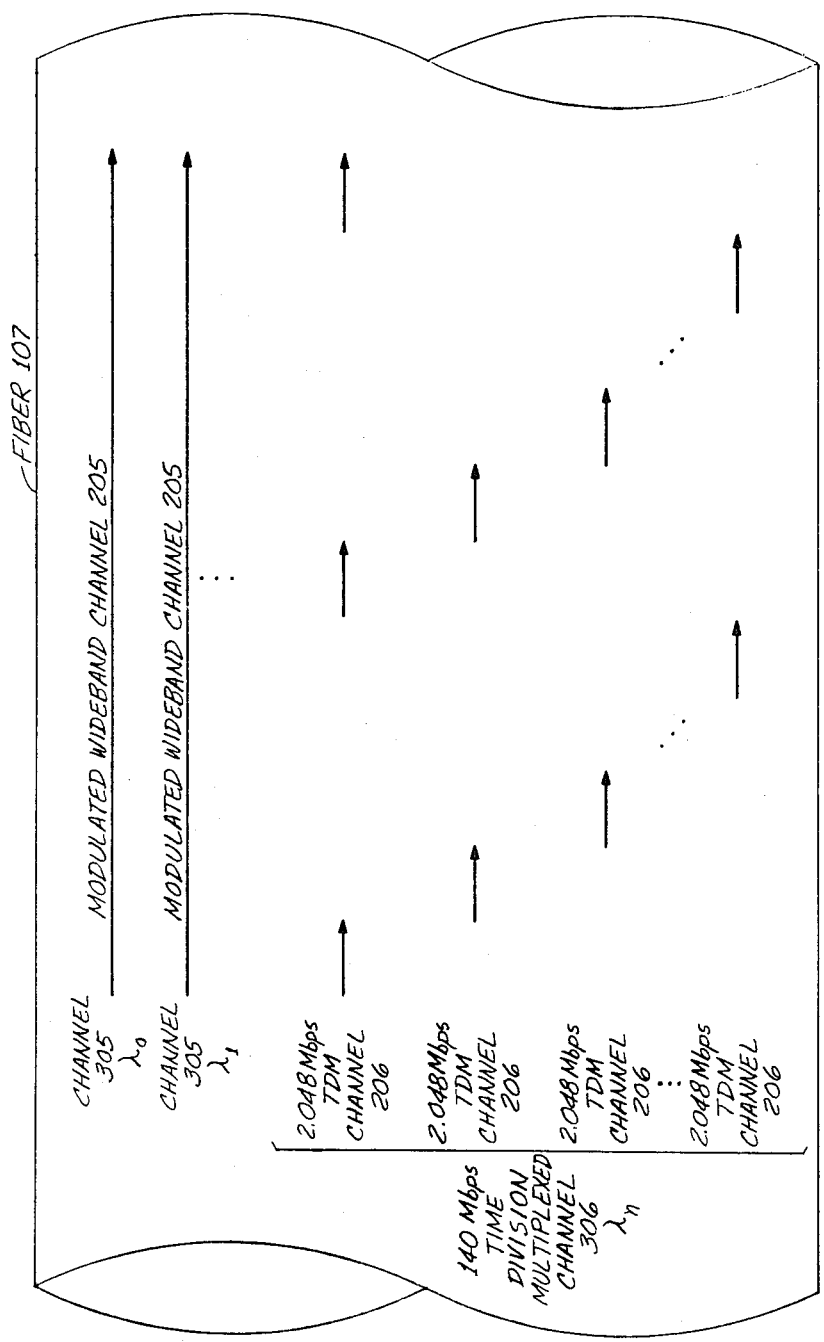
FIG. 6 is a representation of communication channels on a feeder fiber of FIGS. 1 and 2.

Turning first to FIG. 6, it illustrates multiplexing of a simplex fiber 107. This channelization complements the distribution fiber channelization of FIG. 3. Fiber 107 is wavelength-division multiplexed and typically carries anywhere from 10 to 25 wavelengths. Each wavelength defines one of two types of channels 305, 306. Channels 305 are video channels that duplicate the channels 205 of FIG. 3 and are interfaced therewith at the remote nodes 103. Each channel 305 is implemented as a modulated signal stream. Pulse-analog modulation may be used, but pulse code or differential pulse code modulation is preferred. Channels 306 are 140 Mbps digital time-division multiplexed voice and data channels. Each channel 306 carries up to 64 of the voice and data channels 206 of FIG. 3 in time-division multiplexed form. The channels 206 are multiplexed into and demultiplexed from the channels 306 at the remote nodes 103.

Figure 7:
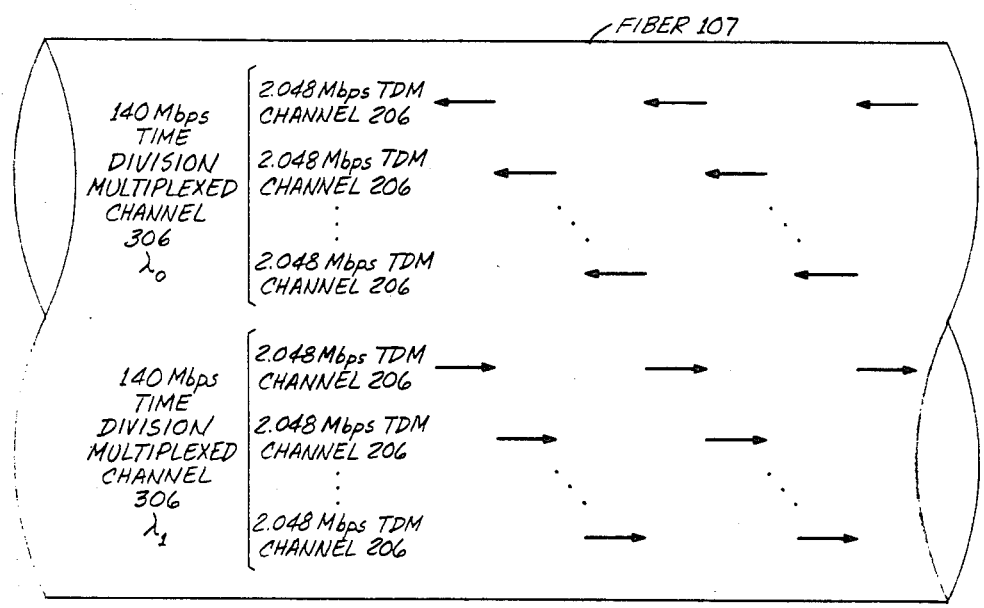
FIG. 7 is a representation of alternative communication channels on a feeder fiber of FIGS. 1 and 2.
Figure 7:
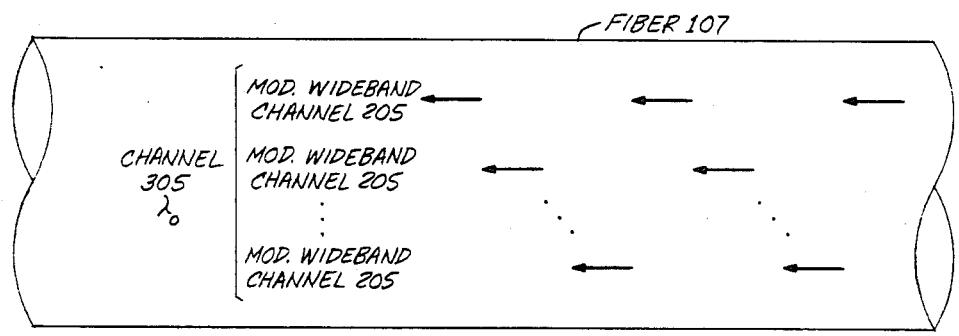
Figure 7:
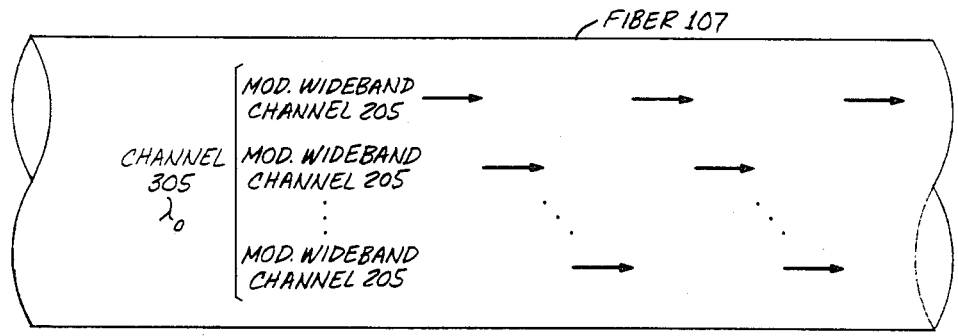

FIG. 7 illustrates channelization that involves a mix of full duplex fibers 107 and simplex fibers 107. A duplex fiber 107 is wavelength-division multiplexed and carries two wavelengths simultaneously, one in each direction. These wavelengths are used to carry upstream and downstream voice and data channels 306. Channels 306 are digital time-division multiplexed and each has a bandwidth of 146 Mbps, 878 Mbps, or 1.7 Gbps, depending on the type of fiber 107 used. Each channel 306 carries a plurality of channels 206 in TDM form, up to as many as the channel's bandwidth allows.

Separate simplex fibers 107 are used for video channels 305. Fibers 107 that carry video channels 305 are shown as not being wavelength-division multiplexed: there is one fiber 107 for each channel 305. (In an alternative embodiment (not shown), fibers 107 are wavelength-division multiplexed, with each fiber 107 carrying two wavelengths in the same direction and each wavelength defining one channel 305.) Channels 305 are digital time-division multiplexed channels, each having a bandwidth of 146 Mbps, 878 Mbps or 1.7 Gbps, again depending on the type of fiber 107 used. Each channel 305 carries a plurality of channels 205 in TDM form.

Of course, other channelization arrangements (not shown) may be implemented on fibers 107. For example, a single fiber 107 may be wavelength-division multiplexed to carry a plurality of time-division multiplexed channels 305 and 306, in one or both directions. Each channel 305 and 306 may comprise a time-division multiplexed plurality of one or both kinds of channels 205 and 206.

For purposes of further discussion, it will be assumed that the illustrative network uses the channelization schemes of FIGS. 3 and 6.

COMMUNICATION AND SIGNALING TRUNKS

Typically, communication trunk fibers 112 are multiplexed in a manner like that used on feeder fibers 107. Fibers 112 define channels that are physically equivalent to channels 305, 306 of feeder fibers 107. Unlike a channel 305 of a fiber 107, however, a 140 Mbps digital voice and data channel of a fiber 112 carries up to 2048 wholly independent 64 Kbps narrowband channels 207B in time-division multiplexed form. Illustratively, each of these 2048 channels is used by a different subscriber 102 at any one time, and each is used by different subscribers at different times. Also, channels 207 carried by fibers 112 include no telemetry and signaling channels 207D: all inter-node signaling is carried by signaling trunks 117. Channels 205 and 207B are multiplexed into and demultiplexed from the channels of trunks 112 at central nodes 110 and 111.

SUBSCRIBER PREMISES EQUIPMENT (FIG. 8)

Figure 8:
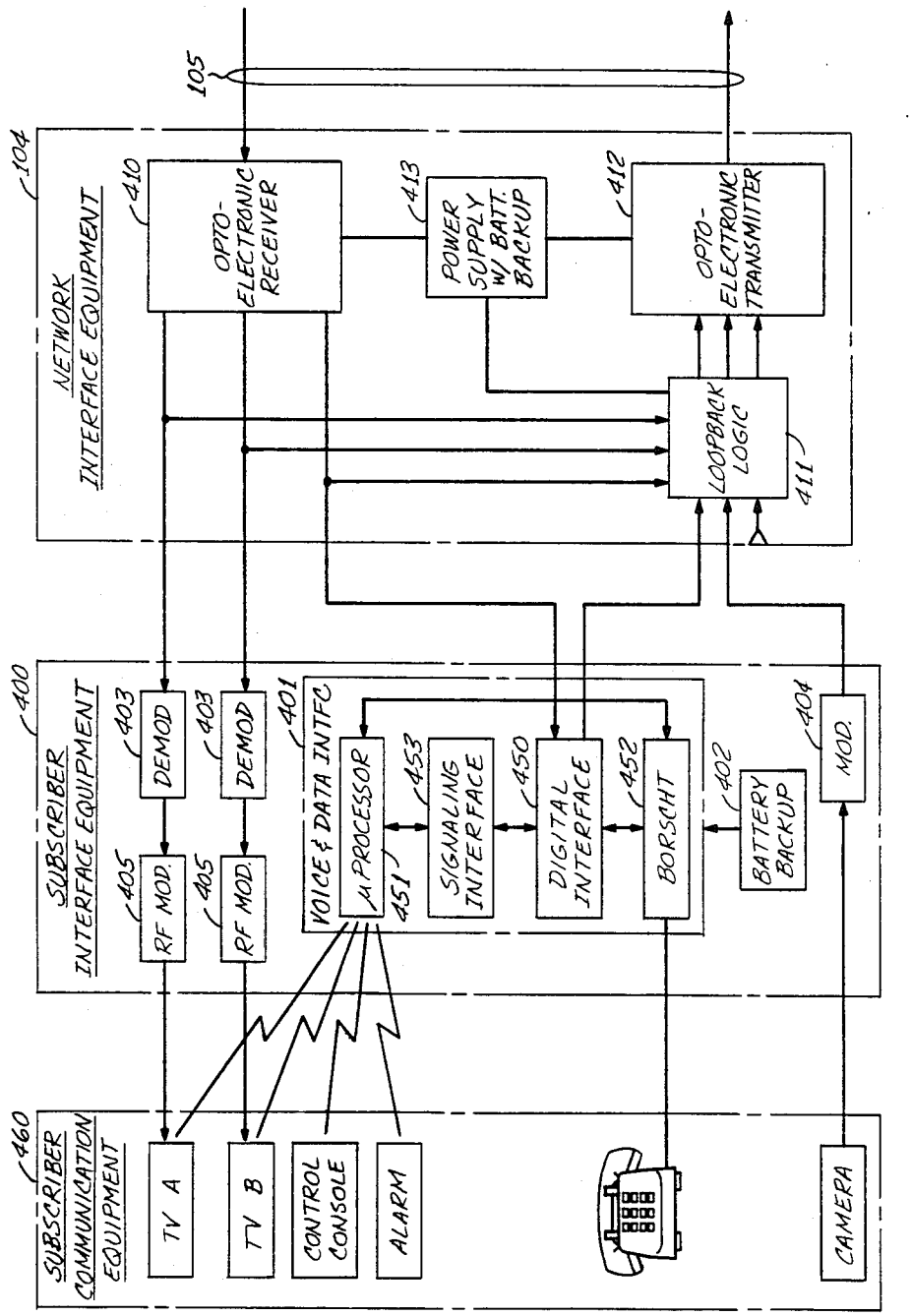
FIG. 8 is a block diagram of subscriber premises equipment, including network interface equipment of FIGS. 1 and 2.

In FIG. 8, three classes of equipment are illustrated as located at, or near, the subscriber premises: network interface equipment 104; subscriber interface equipment 400; and subscriber communication equipment 460. Equipment 104 is typically provided as part of the network of FIGS. 1 and 2. Equipment 460 is typically provided by subscriber 102. And equipment 400 is provided either as part of the network or by subscriber 102. Optionally, a plurality of subscribers 102 may share equipment 400 in a multiplexed fashion (not shown).

Equipment 104 wavelength-division multiplexes individual upstream channels 205 and 206 into the channelization arrangement used on fibers 105, demultiplexes fibers 105 into individual constituent downstream channels 205 and 206, and provides conversion between the electrical domain, in which equipment 400 operates, and the optical domain of network transmissions, in order to interface equipment 400 to the network. Equipment 104 also supports network maintenance functions, by looping back downstream channels on demand toward remote node 103 for fault isolation.

Equipment 104 terminates the subscriber's distribution fibers 105. Downstream channels 205 and 206 are coupled to an opto-electronic receiver 410, and an opto-electronic transmitter 412 is coupled to upstream channels 205 and 206.

Receiver 410 wavelength-division demultiplexes downstream signals carried by fiber 105 into the constituent channels 205 and 206, and converts each channel's signal stream from the optical into the electrical domain. Illustratively, receiver 410 comprises photodetectors. Receiver 410 has a plurality of separate electrical output ports, one for each downstream channel 205 and 206. Electrical signal streams are coupled from the output ports of receiver 410 to equipment 400 and to input ports of logic 411 of FIG. 8. Corresponding output ports of logic 411 are coupled to input ports of transmitter 412. Logic 411 monitors the signal stream output of receiver 410 for loopback commands from central node 110. Upon receipt of such a command, logic 411 supplies the signal streams output by receiver 410 to transmitter 412; otherwise, logic 411 keeps receiver 410 disconnected from transmitter 412.

Transmitter 412 has a plurality of separate electrical input ports, one for each upstream channel, which are coupled to the output ports of loopback logic 411. Transmitter 412 receives at such ports signal streams each representing an upstream channel 205 or 206, converts them into optical signals, wavelength-division multiplexes the signals into the format of fibers 105, and transmits them into fibers 105. Illustratively, transmitter 412 comprises light emitting diodes if fibers 105 are multi-mode fibers, and semiconductor laser diodes if fibers 105 are single-mode fibers.

Transmitter 412 is coupled to equipment 400 via logic 411, which has a plurality of electrical inputs, each for information carried by one of the channels 205 and 206 from equipment 400. Logic 411 merely transfers the signal streams received from equipment 400 to transmitter 412 when no loopback command is being received; when a loopback command is received, logic 411 functionally disconnects the equipment 400 from transmitter 412 and instead couples the transmitter 412 to the output ports of receiver 410.

Since the network's link to the subscriber premises is optical and not electrical, reliable power is provided at subscriber premises for equipment 104 with battery back-up 413, which provides power necessary for continuation of essential telephony and telemetry services in case of primary power outage.

Equipment 400 provides appropriate interfaces to the network for various pieces of subscriber communication equipment 460. The kind of equipment included in equipment 460 illustratively includes PBXs, telephone sets, alarm sensors, computers, remote controllers, codecs, sound reproduction systems, video cameras, video recorders and players, television sets, and interfaces to other types of communication systems. Illustratively, a control console provides centralized control for user functions of all subscriber communication equipment. Alternatively, the various pieces of equipment each have their own keypad for control of user functions of that equipment (for example, TV and radio channel changes). In practice, a wide variety of equipment will be interfaced to the network, based on whether the subscriber is a residence or a business, a consumer or a provider of communication services, and the needs of the specific subscribers in these categories.

Certain components of equipment 400 are considered essential, because they are necessary for making and receiving signaling and telemetry service requests. These components are designated as a voice and data interface 401. Due to its necessity, interface 401 has back-up power provided by a local battery 402.

Interface 401 includes a digital interface 450, which receives from receiver 410 a signal stream that represents the 2.048 Mbps multiplexed voice and data channel 206. Interface 450 demultiplexes channel 206 into component 64 Kbps channels 207 and then connects each to its appropriate destination. In particular, interface 450 connects channels 207B that carry telephony to a BORSCHT circuit 452, and connects signaling and telemetry channel 207D to a signaling interface 453.

Similarly, interface 450 accepts digital signal stream inputs from various sources, including BORSCHT circuit 452 and signaling interface 453, adjusts their rates to the 64 Kbps channel rate, and multiplexes them into channel 206. It then sends the signal stream of channel 206 to loopback logic 411 for input to transmitter 412, for transmission on a fiber 105.

Signaling interface 453 communicates with a microprocessor 451, which is the central hub of intelligence for interface 400. Interface 453 implements the LAP D protocol on channel 207D. Interface 453 receives from microprocessor 451 telemetry data and signaling information (such as service requests), formats these into frames, and forwards the frames encoded in LAP D format to interface 450 for insertion into upstream channel 207D via logic 411. Interface 453 also receives from interface 450 signals conveyed via receiver 410 by downstream channel 207D of fiber 105, extracts from these LAP D-encoded signals the frames of telemetry control and signaling information, and forwards the extracted information to microprocessor 451 for use in controlling subscriber communication equipment 460.

BORSCHT circuit 452 provides the conventional functions needed for digital transmission and reception of telephony: battery, overvoltage protection, ringing, supervision, digital coding of analog voice signals and decoding of digital signals, a hybrid circuit, and test facilities. Circuit 452 provides to microprocessor 451 notice of telephone stimulus signaling from the telephone, and provides stimulus signaling to the telephone under control of microprocessor 451.

Microprocessor 451 collects telemetry data and signaling information from subscriber communication equipment 460. It forwards the telemetry data to signaling interface 453. On the basis of the signaling information, it generates service requests to central node 110 and forwards the requests to digital interface 453. Microprocessor 451 also provides control signaling to equipment 460 in response to telemetry control and signaling information that it receives from central node 110 via digital interface 453. Furthermore, microprocessor 451 provides feature functionality including such features as connection forwarding, speed matching and error handling for data, and "speed calling". Microprocessor 451 interacts with equipment 460 independently and in a manner suited for real time interaction with the subscriber. For example, microprocessor 451 provides the subscriber with prompts and awaits subscriber responses thereto.

Video channel 205 signal streams received by equipment 400 from receiver 410 are modulated, illustratively by pulse-analog pulse-code, or differential pulse-code, modulation. Because they are modulated, the signal streams are connected at equipment 400 to demodulators 403 which demodulate them from the modulated format. Optionally, the demodulated signals are then radio-frequency modulated, by RF modulators 405, for viewing on conventional television sets. Conversely, signal streams that represent upstream video channels 205 are passed through modulators 404, to place them in the proper modulated format for transmission, before being input to transmitter 412.

REMOTE NODE (FIG. 9)

Each remote node 103 performs multiplexing and demultiplexing functions for voice and data channels 206 and performs certain limited switching functions (fanout and user channel changing) for video channels 205. Each remote node 103 is partitioned into three functional parts: a distribution interface 500, switching and control 502, and a feeder interface 501.

Distribution interface 500 comprises an optical cross-connect 504 and, in certain implementations, a plurality of line interface units 503. Cross-connect 504 serves to terminate all active and inactive distribution fibers 105 entering remote node 103, and to couple active ones of those fibers to line interface units 503 via optical fiber jumpers (not shown). When a previously-inactive distribution fiber is to be placed into service, a jumper is used to couple the fiber's appearance on the distribution side of cross-connect 504 to an unused input of a unit 503. The use of cross-connect 504 allows the remote node hardware to grow in a modular fashion, yet still maintain order among the large number of distribution fibers entering the remote node.

The principal functions of units 503 are conversion of signals between the electrical domain of switching and control 502 and the optical domain of fibers 105, and wavelength-division multiplexing. There are two types of units 503: downstream units 503a and upstream units 503b. One downstream unit 503a is associated with downstream channels 205 and 206 of a fiber 105, and one upstream unit 503b is associated with upstream channels 205 and 206 of a fiber 105.

Downstream unit 503a receives electrical signals representing communication traffic on downstream channels 205 and 206 from switching and control 502. If fibers 105 are multiplexed in the manner shown in FIG. 3, these signals comprise a plurality of separate signal streams each representing traffic on one channel 205 and 206. Downstream unit 503a converts the signal streams from the electrical into the optical domain and wavelength-division multiplexes them into the channelization format of fiber 105. It then transmits the multiplexed optical signals into fiber 105. Illustratively, unit 503a comprises light emitting diodes if fiber 105 is a multi-mode fiber, and comprises semiconductor laser diodes if fiber 105 is a single-mode fiber.

Upstream unit 503b receives optical signals from fiber 105. If fibers 105 are multiplexed in the manner shown in FIG. 3, these signals comprise wavelength-division multiplexed traffic on upstream channels 205 and 206. Upstream unit 503b wavelength-division demultiplexes these signals into separate signal streams each representing traffic on one of the channels 205 and 206, and converts the signals from the optical into the electrical domain. It then sends the separate electrical signal streams to switching and control 502. Illustratively, upstream unit 503b comprises photodetectors.

Figure 9:
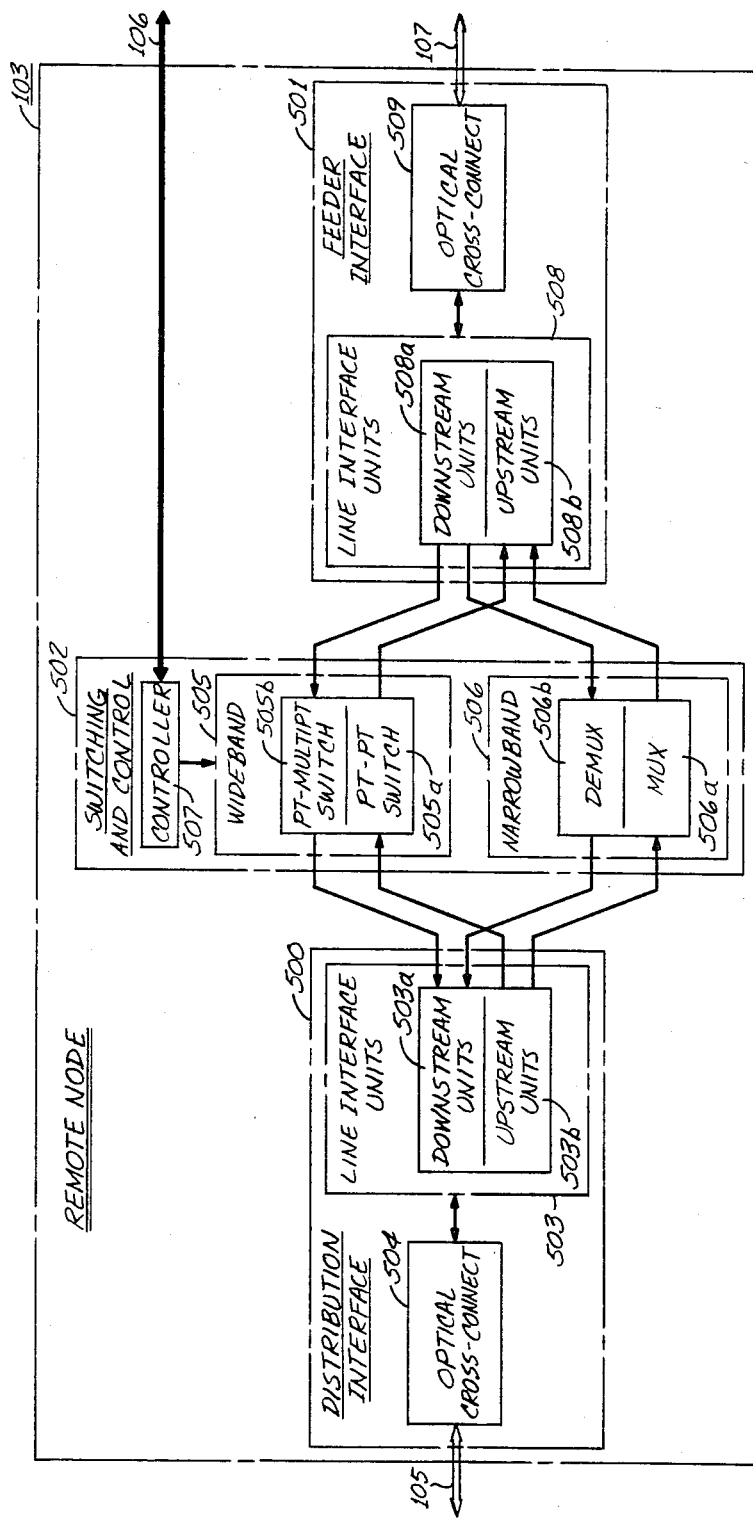
FIG. 9 is a block diagram of a remote node of FIGS. 1 and 2.
Figure 10:
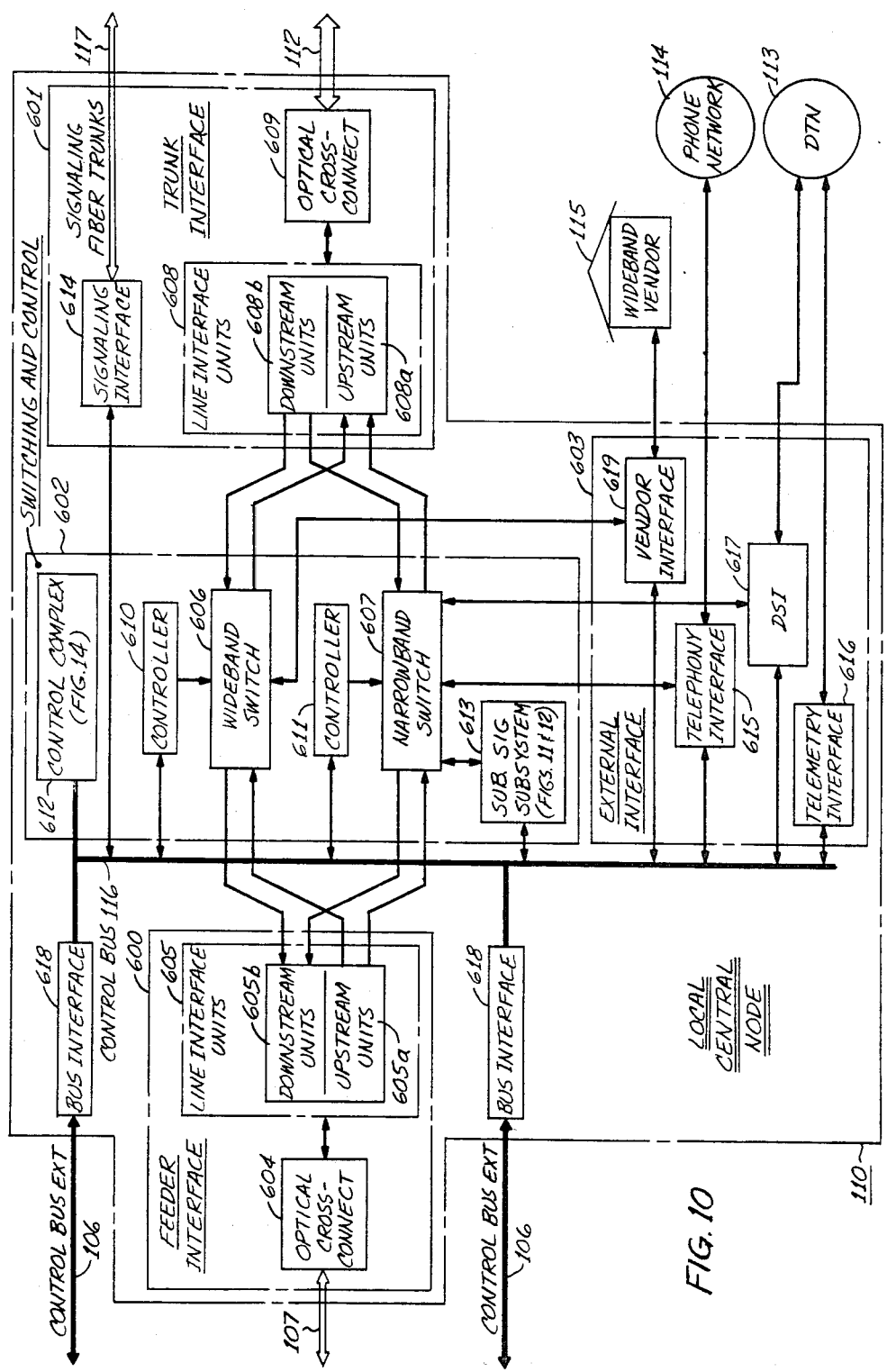
FIG. 10 is a block diagram of a local central node of FIGS. 1 and 2.

While FIG. 9 shows units 503 as being physically separate from switching and control 502, it is desirable to have units 503 situated as close to input and output ports of switching and control 502 as possible, so as to minimize distances over which high-rate communication signals are transported in electrical form. If the channelization format of fibers 105 is that shown in FIG. 4, the functionality of units 503 may be incorporated directly into input and output port circuitry of switching and control 502. Use of separate line interface units 503 is thereby advantageously eliminated, as is the transport outside of switching and control 502 of communication signals in electrical form.

Switching and control 502 is interposed between, and coupled to, interfaces 500 and 501, and performs the primary remote node functions of multiplexing and demultiplexing of point-to-point narrowband communications, and distribution and channel changing of multipoint wideband communications.

Other functions are optionally provided by switching and control 502: for example, a remote node may optionally have the functionality of a full-fledged private branch exchange (PBX). However, for reliability and maintenance purposes, it is preferable to keep switching and control functions of a remote node to a minimum and to concentrate these functions at central node 110.

Switching and control 502 includes two communication-handling fabrics 505 and 506, each for handling a different type of traffic passing through remote node 103. Wideband fabric 505 is provided for handling video channels 205, and narrowband fabric 506 is provided for handling voice and data channels 206. Both fabrics 505 and 506 are used principally to route traffic between subscribers 102 and central node 110, and do not provide intra-remote node switching between subscribers 102.

In this illustrative example, wideband fabric 505 is a wideband digital switch. It is, for example, the VI-VID ™ video teleconferencing system switch of AT&T Network Systems, which is a space-division digital switch fabricated out of switched power emitter coupled logic (SPECL) digital switching devices each having a switching bandwidth in excess of 100 Mbps. Such devices are described for example, in U.S. Pat. No. 4,535,360. Wideband switch 505 provides a switched interconnection between video channels 205 of fibers 105 and video channels 305 of feeder fibers 107. Functionally, switch 505 has two parts: a point-to-point part 505a and a point-to-multipoint part 505b. Part 505a processes upstream traffic and provides switched interconnection between individual upstream video channels 205 and individual upstream video channels 305. Part 505b processes downstream traffic and provides switched interconnection between individual downstream video channels 305 and one or more video channels 205, thereby selectively fanning out a channel 305 to a plurality of channels 205. A communication incoming from central node 110 (for example, a TV broadcast channel) can be connected thereby to one or more subscribers 102 on demand. Upstream traffic is strictly point-to-point in nature, albeit it may comprise source material for broadcast services.

A controller 507 is coupled to the wideband fabric 505 and controls switch closures therein to provide video channel change functions for subscribers 102, coordination with node 110 for the provision of point-to-point services, and processing of maintenance commands received from the node 110. Controller 507 operates under direction of the central node 110 and receives control commands therefrom over control bus extension 106.

Narrowband fabric 506 provides interconnection between voice and data channels 206 of distribution fibers 105 and voice and data channels 306 of feeder fibers 107. Though implemented in a conventional digital time-division switch, fabric 506 does not provide switching functions, but rather functions as a multiplexer and demultiplexer. Implementation of fabric 506 in a switch merely enables the multiplexing and demultiplexing functions to be easily reconfigured. The switching pattern is fixed: hence, unlike fabric 505, fabric 506 does not require a controller.

There are two functional parts within the fabric 506: a multiplexer 506a and a demultiplexer 506b. Multiplexer 506a handles upstream communications. It time-division multiplexes upstream channels 206 from a plurality of distribution fibers 105 into a single upstream channel 306 of a feeder fiber 107. The high level of multiplexing of channels 306 provides for efficient utilization of the bandwidth of fibers 107 and thereby serves to reduce the number of fibers 107 interconnecting remote node 103 with central node 110. Demultiplexer 506b handles downstream communications. Its function is the converse of the multiplexer function: it demultiplexes downstream channels 306 of fibers 107 into their constituent downstream channels 206 and distributes channels 206 to the appropriate subscribers' distribution fibers 105.

Feeder interface 501 of remote node 103 interfaces switching and control 502 to feeder fibers 107. It comprises optical cross-connect 509 and a plurality of line interface units 508. All fibers 107 extending between remote node 103 and central node 110 are physically terminated on cross-connect 509. Active ones of the fibers are connected to units 508 with fiber jumpers.

Principal functions of units 508 are conversion of signals between the electrical domain of switching and control 502 and the optical domain of fibers 107, and wavelength-division multiplexing and demultiplexing of fibers 107. There are two types of units 508: downstream units 508a and upstream units 508b. Upstream units 508b receive from switching and control 502 signal streams representing upstream channels 305 and 306, convert them from the electrical to the optical domain, wavelength-division multiplex a plurality of these streams, and transmit the multiplexed optical signal stream on fibers 107. Downstream units 508a receive downstream wavelength-division multiplexed optical signal streams on fibers 107, demultiplex them into their constituent signal streams representing downstream channels 305 and 306, and convert them from the optical domain of fibers 107 into the electrical domain of control 502.

Interface units 508 desirably are situated as close to input and output ports of control 502 as feasible. If the channelization arrangement of fibers 107 is that shown in FIG. 7, the functionality of units 508 is preferably incorporated directly into input and output port circuitry of switching and control 502. Use of separate interface units 508 is thereby advantageously eliminated, as is the transport outside of switching and control 502 of communication signals in electrical form.

LOCAL CENTRAL NODE (FIG. 10)

Selected interconnection between subscribers 102 themselves, and with the rest of the network of FIGS. 1 and 2 and other communication systems, is furnished by each local central node 110. Node 110 is functionally partitioned into four parts: a feeder interface 600, switching and control 602, trunk interface 601, and external interface 603.

Feeder interface 600 comprises a plurality of interface units 605 and a feeder optical cross-connect 604. Interface 600 is a duplicate, albeit on a larger scale, of interface 501 of a remote node 103. The functionality of units 605 is similarly incorporatable into ports of switching and control 602.

Interposed between interfaces 600, 601, and 603, switching and control 602 performs the primary, subscriber service, functions of central node 110. Switching and control 602 comprises two fabrics: wideband fabric 606 for handling video channels, and narrowband fabric 607 for handling voice and data channels.

Except for scale and intraswitching capability, fabric 606 is the same as fabric 505 of remote node 103. Illustratively, it, too, is implemented as the VIVID teleconferencing system switch. Fabric 606 is used for switching both upstream and downstream video communications. It carries both full duplex traffic (two-way video telephone) and one-way traffic (video on demand). Fabric 606 is non-blocking, and has fanout and broadcast capability to connect a single input port to any or all of its outputs ports. Fabric 606 handles point-to-multipoint (both broadcast and narrowcast) and point-to-point communications. Broadcast connections are made by fabric 606 to all subtending remote nodes 103, while narrowcast connections are made only to selected remote nodes 103. Optionally, wideband vendors 115 deliver video to fabric 606 over dedicated facilities—dedicated fibers and vendor interface 619—if many channels are required. Otherwise, such channels are routed from a subscriber 102 to fabric 606 via shared fibers 107, through a remote node 103. Fabric 606 provides wideband access to remote nodes 103, as well as to tandem and to other local central nodes to which central node 110 is connected, as shown in FIGS. 1 and 2. Access to nodes of the network of FIGS. 1 and 2 is provided through trunk interface 601.

Narrowband fabric 607 is a time-division digital switch. It switches time slots of individual 64 Kbps narrowband channels 207 that make up channels 306. Fabric 607 thus provides independent routing, and hence complete and independent interconnectivity, for individual voice and data communications of subscribers 102.

The time-division digital switch handles diverse communication formats including packetized communications. However, fabric 607 may alternatively comprise a time-division digital switch plus a packet switch (not shown). In such a configuration, the packet switch is used to provide switching for channels 207B that are carrying communications in packet form more efficiently than is done by the time-division switch.

Fabric 607 provides intra-node switching for subscribers 102. It also provides subscribers 102 with access to toll and to other local central nodes, through trunk interface 601. And it provides subscribers 102 with access to other communication systems, through external interface 603. Fabric 607 receives signal streams from, and delivers signal streams to, trunk interface 601 in a time-division multiplexed format (for example, at 140 Mbps) comprising a plurality of multiplexed active 64 Kbps channels 207B. It receives signal streams from, and delivers signal streams to, external interface 603 as single 64 Kbps channels 207B. Like the wideband fabric 606, the narrowband fabric 607 has point-to-multipoint switching capability, for providing services such as electronic mail and electronic bulletin board.

Each fabric 606, 607 is coupled to a controller 610, 611, respectively, which executes switch closures in fabrics 606, 607, under direction of commands from a central node control complex 612. For purposes of communication with complex 612, both controllers 610, 611 and complex 612 are connected to a high-speed communication medium, illustratively a control bus 116. Illustratively, bus 116 is the S/NET communication bus. By way of example, this bus is disclosed in an article by S. R. Ahuja, entitled "S/NET: A High-Speed Interconnect for Multiple Computers", in IEEE *Journal on Selected Areas in Communications*, Vol. SAC-1, No. 5 (November 1983), and in U.S. Pat. No. 4,384,323 to Ahuja.

Complex 612 functions to manage the resources of the network within central node 110 and remote nodes 103. Complex 612 performs call processing, routing, administrative, billing, and maintenance functions. Illustratively, complex 612 comprises a plrrality of computers programmed to perform the network control functions. Complex 612 communicates with rontrollers 610, 611 over control bus 116 and control bus extensions 106, and thereby directs operation of fabrics 606, 607 and 505. Each bus extension 106 is coupled to the brs 116 via a bus interface 618, which matches extension 106 to the electrical and protocol characteristics of bus 116.

Complex 612 is principally resporsible for setting up communication paths to and from subscribers 102 over channels 207B and 205. For this purpose, complex 612 communicates with the subscriber interface equipment 400 of FIG. 8, via signaling messages sent over signaling and telemetry channels 207D. The time slots of all subscribers' signaling and telemetry channels 207D, both upstream and downstream, are connected through narrowband fabric 607 via nailed up, i.e., semi-permarent, switch connections to a subscriber signaling subsystem 613.

LOCAL CENTRAL NODE-SUBSCRIBER SIGNALING SUBSYSTEM (FIGS. 11 AND 12)

Subsystem 613 implements the LAP D communication protocol on channels 207D at node 110. Subsystem 613 separates communications incoming over upstream channels 207D into telemetry data messages and signaling messages. Subsystem 613 is connected to the control bus 116; via the bus 116 it sends the signaling messages to the control complex 612, and sends the telemetry data messages to a telemetry interface 616 of external interface 603. In the downstream direction, subsystem 613 receives signaling messages from complex 612 and receives telemetry control messages from interface 616 also over the bus 116. It then converts the messages into proper LAP D format and inserts these messages into time slots of downstream channels 207D toward destination subscribers 102.

Figure 11:
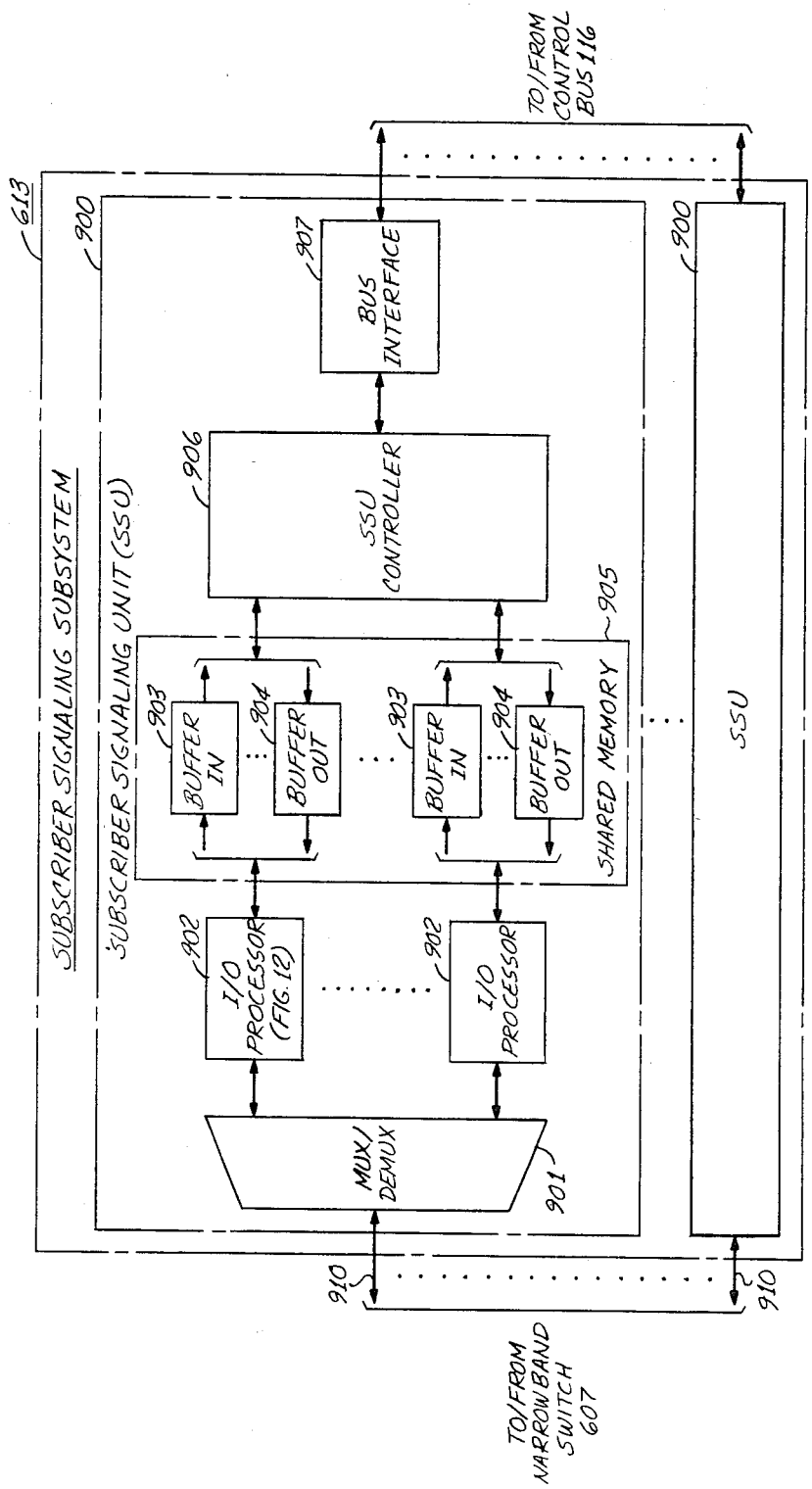
FIG. 11 is a block diagram of the subscriber signaling subsystem of the node of FIG. 10.

Illustratively, subscriber signaling subsystem 613 is configured as shown in FIG. 11. Subsystem 613 comprises a plurality of signaling subsystem units (SSUs) 900 which are duplicates of each other. Each unit 900 transfers telemetry and signaling messages passing between a particular group of subscribers 102 and complex 612 and interface 616. Each unit 900 serves, for example, a group of 256 subscribers.

Each unit 900 is connected to narrowband switch 607 by a bidirectional link 910. Each link 910 carries an upstream and a downstream time-division multiplexed stream of signals carried by signaling and telemetry channels 207D of subscribers 102 of the group served by that unit 900. Each stream comprises a repeating series of time slots. Each time slot of the series is associated with a particular subscriber 102. Each time slot carries a multi-bit, for example, an 8-bit, slice of the signals carried by the associated subscriber's channels 207D.

Each unit 900 comprises a plurality of input and output processors (IOPs) 902, each of which serves a subgroup of the group of subscribers 102 served by the unit 900. Illustratively, each unit 900 has eight IOPs 902, each serving a subgroup of 32 subscribers 102. A multiplexer and demultiplexer (MUX/DEMUX) 901 interfaces a link 910 with the IOPs 902 of a unit 900. MUX/-DEMUX 901 separates a multiplexed signal stream incoming over the connected link 910 from switch 607 into a plurality of multiplexed signal substreams, one substream for each IOP 902. Each IOP's substream is made up of the time slots associated with the subscribers 102 of that IOP's subscriber subgroup, and carries messages from those subscribers 102 to control complex 612 and interface 616. MUX/DEMUX 901 sends these substreams to the appropriate IOP's 902. MUX/DEMUX 901 also receives signal substreams, one from each IOP 902. Each such substreax is made up of the time slots associated with subscribers 102 of the IOP's subscriber subgroup, and carries messages from control complex 612 and interface 616 to those subscribers 102. MUX/-DEMUX 901 combines the received substreams into a single multiplexed signal stream and transmits the stream on the connected link 910 to switch 607.

Figure 12:
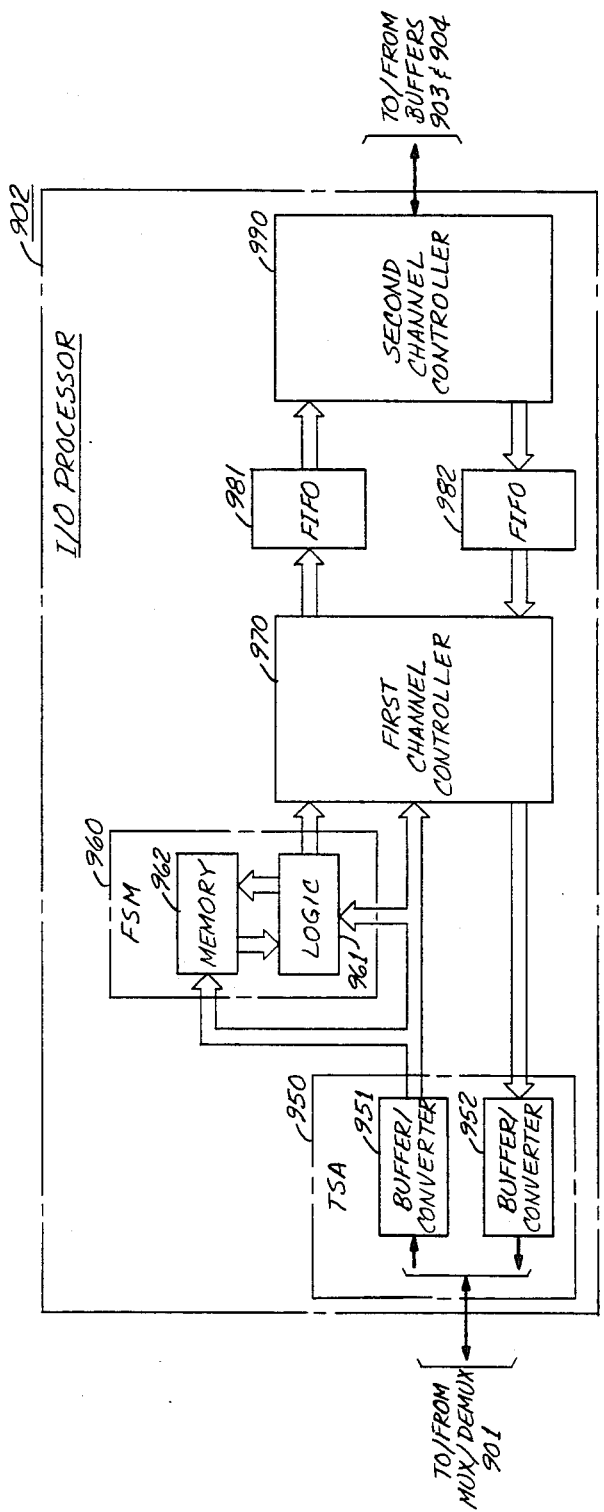
FIG. 12 is a block diagram of a subscriber signaling unit of the subsystem of FIG. 11.

With respect to the incoming substream received from MUX/DEMUX 901, the function of an IOP 902 is to extract signaling and telemetry message slices from the time slots of the substream, to block all cther signal slices carried by those time slots, and to assemble the extracted message slices into the original signaling and telemetry messages sent by subscribers 102. In the downstream direction, IOP 902 functions to disassemble into message slices the signaling and telemetry messages that are intended for transmission to subscribers 102 that it serves, and to insert the message slices and other signals into the proper subscribers' time slots of the outgoing multiplexed signal substream, for input to MUX/DEMUX 901. For example, if communications on the signaling and telemetry channels 207D follow a signaling protocol which requires that idle code be transmitted when no messages are being transmitted, (such as the LAP B protocol, also defined by CCITT standards), IOP 902 discards idle code slices from the incoming signal substream, and inserts idle code slices into the outgoing signal substream when it has no message slices to insert therein and to separate slices of consecutive messages. The structure of an illustrative IOP 902 is shown in FIG. 12 and is discussed in conjunction therewith.

Each IOP 902 sends messages demultiplexed from its incoming substream to a subscriber signaling unit (SSU) controller 906, and receives from the controller 906 messages for multiplexing into its outgoing substream. Each unit 900 has a single controller 906. Controller 906 and IOPs 902 communicate with each other through a shared memory 905. Memory 905 functions as a plurality of buffers 903 and 904. Each IOP 902 has assigned thereto several buffers 903 for sending messages tc controller 906 and several buffers 904 for receiving messages from controller 906. A buffer 903, or 904, is associated with a particular subscriber 102 served by the IOP 902 and holds messages from, or for, that subscriber when a message is being received from, or sent to, that subscriber, respectively.

Controller 906 extracts from buffers 903 messages received from subscribers 102 and forwards them to a bus interface 907. Controller 906 also receives messages from bus interface 907, examines each to determine the subscriber 102 for whom the message is intended, and places each in the appropriate buffer 904 of IOP 902 that serves that subscriber.

Bus interface 907 communicates on bus 116 on behalf of unit 900 according to the protocol of bus 116. Interface 907 receives signaling and telemetry messages from controller 906 and transmits them over bus 116 to complex 612 and to interface 616, respectively. Interface 907 also monitors the destination of messages passing over bus 116, receives those destined for subscribers 102 served by the associated unit 900, and sends these received messages to controller 906.

The configuration of an illustrative IOP 902 is shown in FIG. 12. The signal substream incoming from MUX/DEMUX 901 is input to a time slot access (TSA) circuit 950. TSA circuit 950 enables IOP 902 to access the contents of individual time slots of a multiplexed substream. A buffer/converter circuit 951 of TSA circuit 950 buffers the incoming signal substream and converts it from serial to parallel form. The slices making up the substream enter buffer/convelter 951 in serial form and are stored therein. Buffer/converter 951 is wide enough to store a plurality of slices carried by consecutive time slots, one slice for each subscriber 102 served by IOP 902. The slices are extractsd from buffer/converter 951 one at a time. The bits making up a slice are extracted in parallel, and are applied in parallel to inputs of a shared finite state machine 960.

The shared finite state machine 960 performs the functions of a plurality of state machines each dedicated to a different subscriber 102 served by IOP 902. In the machine 960, the plurality of state machines share combinatorial logic 961. Combinatorial logic 961 is conditioned to function as one or another of the state machines by application to its inputs of signals from a memory 962. Memory 962 contains a plurality of storage words, one word for each subscriber 102 served by IOP 902. Each word stores the last slice received from the associated subscriber 102 and the current state of that subscriber's state machine. Application of that stored current state, along with the current and the stored last slice carried by a time slot associated with that subscriber, to the inputs of logic 961 results in the generation at the logic's outputs of an address, a control code, and a new current state. The new current state and the currently-received slice are then applied to the inputs of memory 962 and are stored in the storage word associated with the subscriber, in place of the preceding current state and last-received slice. The address identifies the subscriber 102 associated with the time slot that carried the slice. And the control code characterizes the type of information represented by the slice. For example, the control code indicates the beginning of an idle period.

The address and the control code, along with the slice, are applied to inputs of a first channel controller 970. It is the function of controller 970 to discard slices that convey no useful information, for example, slices of idle period code. Controller 970 uses the control code to determine whether to discard a slice. Controller 970 sends undiscarded slices, accompanied by their control code and address, to a first-in-first-out buffer (FIFO) 981.

FIFO 981 serves as a communication transfer point between controller 970 and a second channel controller 990. Controller 990 extracts entries from FIFO 981 and reassembles therefrom messages sent by subscribers 102 served by that IOP 902. Controller 990 uses for this purpose the addresses and control codes that accompany the slices. From the address, controller 990 determines the message that a particular slice is a part of. From the control code, it determines what part of the message the slice forms. When it has completed reassembling a message, controller 990 sends it to SSU controller 906, via a buffer 903.

In the downstream direction, controller 990 receives messages from SSU controller 906 via a buffer 904, disassembles them into slices, and generates an address and a control code for each slice. Controller 990 then sends a slice at a time, accompanied by its address and control code, to a FIFO 982. Controller 990 interleaves the slices of messages destined for different subscribers: it sends to FIFO 982 a slice of a message for each subscriber 102 for which it has a message before sending the next slice of a message for any one subscriber, thereby supplying slices to FIFO 982 in the same sequence in which they will appear in the signal substream outgoing from controller 970.

FIFO 982 serves as a communication transfer point between controller 990 and controller 970. Controller 970 extracts slices from FIFO 982 and, based on the accompanying addresses, inserts them into the proper time slots of the outgoing signal substream. Controller 970 fills time slots for which it has no message slices with idle code slices, which it generates. Controller 970 uses the slices' accompanying control codes to determine where one message for a subscriber 102 stops and the next message for that subscriber 102 begins, and separates slices of successive messages with start and stop flags, which it also generates. In many protocols, start and stop flags and idle code are the same.

Controller 970 sends the outgoing substream to a buffer/converter 952 of TSA 950. Buffer/converter 952 functions in reverse from buffer/converter 951. It receives the bits of each slice in parallel form, temporarily stores them, and outputs a serial stream of bits of successive slices to MUX/DEMUX 901.

LOCAL CENTAL NODE-EXTERNAL INTERFACE (FIG. 10)

Interface 603 couples the network to other communication systems 113, 114. Optionally, it also couples the network to wideband service verdors 115, as described above. Interface 603 includes telemetry interface 616 to a data transport network 113 of FIG. 2. Interface 616 implements a conventional packet network protocol, and provides flow control functions and any address translation required between a destination identifier supplied by a subscriber 102 and routing information required by network 113. Interface 616 couples transport network 113 to bus 116. All telemetry data messages from all subscribers 102 are routed by subsystem 613 to interface 616 over bus 116 and are converted by interface 616 into transmission format of network 113. Similarly, interface 616 routes all telemetry control messages that it receives from network 113 to subsystem 613 over bus 116 for insertion into channels 207D.

A data subscriber interface (DSI) 617 of interface 603 couples channels 207B to network 113. Switched connections between channels 207B and DSI 617 are established by fabric 607 under direction of complex 612. DSI 617 is connected to bus 116 to enable complex 612 to request DSI 617 to establish a connection letween a channel 207B and network 113, and to enable DSI 617 to request complex 612 to establish a connection between DSI 617 and a channel 207B. DSI 617 provides data concentration for efficient utilization of network 113 access ports, and provides dial-up and dedicated access thereto. Its structure is that of a DSI of a Local Area Data Transport Network of AT&T Communications, with the exception that the subscriber's data rate at the access ports in the network of FIGS. 1 and 2 is 64 Kbps instead of 4.8 Kbps.

Telephony interface 615 of external interface 603 provides access via channels 207B to a telephone network 114. Access to that network 114 is obtained through a telephony electronic switching system (ESS) equipped with trunk modules. Switched connections between channels 207B and interface 615 are established by fabric 607 under direction of complex 612. Interface 615 is connected to bus 116 to enable complex 612 to request interface 615 to establish a connection between a channel 207B and network 114, and to enable interface 615 to request complex 612 to establish a connection between interface 615 and a channel 207B. Interface 615 converts between the transmission format required by channels 207B and that required by trunk modules of the telephone system. Interface 615 also converts from the message-oriented signaling that is used in the network of FIGS. 1 and 2 to provide services, including telephone services, to the protocol required by the ESS that is providing telephone service to those who are not served by the network of FIGS. 1 and 2. For a digital ESS, the interface 615 merely converts inband signals carried by a channel 207B into those required by a telephony network control and timing (NCT) link, and converts the associated call processing messages carried within the network of FIGS. 1 and 2 on the channels 207D to the format of an interface module on the telephony network control and timing (NCT) link. For an analog ESS, interface 615 converts inband digital signals into analog signals, and converts the message-oriented signaling into stimulus-oriented telephony signaling.

Central node 110 is interfaced to the rest of the network of FIGS. 1 and 2 by trunk interface 601. Interface 601 includes a signaling interface 614 which couples bus 116 to common channel interoffice signaling (CCIS) trunks 117 connecting node 110 with toll and other local central nodes of the network. Interface 614 communicates over bus 116 with complex 612, and communicates over trunks 117 with signaling interfaces of the other central nodes. Interface 614 facilitates CCIS signaling between the central nodes for establishing and taking down subscriber communication paths over communication trunks 112 that extend between central nodes.

Interface 601 further comprises a plurality of line interface units 608 and a trunk optical cross-connect 609, which couple trunks 112 to fatrics 606 and 607. Cross-connect 609 provides physical termination for fibers 112 extending from node 110. Units 608 convert signals between the optical and electrical domains and provide wavelength-division multiplexing and demultiplexing functions. Two types of units 608 are provided. Upstream units 608a convert signal streams representing channels 305 and 306 from the electrical to the optical domain, wavelength-division multiplex a plurality of these streams, and transmit the multiplexed optical signal stream on trunks 112. Downstream units 608b receive wavelength-division multiplexed optical signal streams on trunks 112, demultiplex them into their constituent signal streams that represent channels 305 and 306, and convert the demultiplexed signals from the optical into the electrical domain. Depending upon the channelization format of trunks 112, functionality of units 608 may be implemented in input and output port circuitry of fabrics 606 and 607 to eliminate use of separate units 608.

TOLL CENTRAL NODE (FIG. 13)

Toll node 111 provides interconnection between local central nodes 110. It is a simplified local central node 110. A node 111 functionally comprises two parts: a trunk interface 701 and switching and control 702. Interface 701 duplicates trunk interface 601 of local central node 110. And switching and control 702 duplicates switching and control 602 of central node 110, the exception being the absence of subscriber signaling subsystem 613. Subsystem 613 is not needed because all signaling to and from node 111 proceeds over signaling trunks 117 and not over channels 207D.

CONTROL SOFTWARE

Provision of communication services in the network of FIGS. 1 and 2 is controlled by software residing in microprocessor 451 of subscriber interface equipment 400 and control complexes of nodes 110 and 111. Since the network provides a wide variety of services in a single system, the control software manages a wide range of communication resources, handles different types of signaling and protocols, and provides extensive switching capabilities (for example, for broadcast video selection). And the software provides any arbitrary combinations of the wide variety of services.

The control software views the network as a set of heterogeneous communication resources that provide connectivity among subscribers. The control of the network involves: 1. routing and processing of calls, 2. management of network communication resources, and 3. billing, administrative, and maintenance functions.

So as not to impose a limited predefined set of services on subscribers, and to allow for future provision of as-yet unforeseen services, the software provides capability components out of which services can be built. In particular, the software provides a set of communication resources from which subscribers can fashion services. The subscribers develop whatever services, terminals, and human interfaces they feel are appropriate for their intended applications. They then acquire and control those network communication resources that they feel are necessary to interface their services to the network. Subscribers acquire and control these resources via signaling messages of the LAP D protocol sent over signaling and telemetry channels 207D. Unlike stimulus-oriented signaling that requires several disjoint actions to invoke a feature, message-oriented signaling allows a complete service request to be contained in a single message.

The network provides subscribers 102 with a standard LAP D signaling interface through which they control their connectivity to other subscribers 102. From the point of view of subscriber interface equipment 400, the network is one monolithic unit. The internal structure of the network is not visible to equipment 400. In particular, equipment 400 is not aware of the functional partitioning between central node 110 and subtending remote nodes 103.

There are two kinds of network resources that a subscriber 102 can request and manipulate: calls and conferences. A call is a single-medium path between two points, usually between two subscribers. In this context, the word "medium" refers to the form of information (narrowband or wideband) and not to the transmission medium, which is always optical fiber in this illustrative example. Types of calls are either one-way (i.e., simplex, requiring use of one channel) or two-way (i.e., duplex, requiring use of two channels). A conference is an entity in the network that combines two or more calls into a larger, more complex structure. Each conference has a conference type and is connected by calls to subscribers and/or to other conferences. Types of conferences are simplex (requiring a single channel connection to each participating subscriber) or duplex (requiring both an upstream and a downstream channel connection to each subscriber). A simplex conference is a broadcast. As the need arises, new conference types may be defined and added to the network.

CONTROL SOFTWARE-SUBSCRIBER INTERFACE EQUIPMENT

The network and the equipment 400 interact by sending signaling messages to each other. Equipment 400 sends messages to the network in order to request that some action be taken on behalf of the associated subscriber. The network sends messages to equipment 400 to notify it of some event. Each message has a message type and a list of message parameter values. The message type specifies the general meaning of the message. This general meaning is made specific by the parameter values. The list of required parameter values depends on the message type. A suitable list of message types and parameters is defined by Recommendation I.451 formulated by the CCITT as part of the ISDN standards.

Software of equipment 400 is functionally divided into a call processing subsystem and a peripheral control subsystem. The functions provided by the call processing subsystem include responding to signaling messages received from the network, interfacing to other subscriber premises equipment, and responding to subscriber service requests.

The function of the peripheral control subsystem is to insulate the call processing subsystem from the details of the hardware of equipment 400. The peripheral control subsystem comprises device handlers, each of which provides a software interface to peripherals that are included in equipment 400, and a message handler that provides an interface to central node control complex 612. One function of the message handler is the formatting of messages sent to it from the call processing subsystem for transmission to central node 110, and routing of messages received from central node 110 to the appropriate customer interface software. A second function is the implementation of network features, such as repertory connection establishment (for example, speed calling), data speed matching, data error handling, and connection forwarding.

CONTROL SOFTWARE-CENTRAL NODE (FIG. 14)

Central node 110 software, which performs functions necessary to provide multimedia connectivity among subscribers 102, is functionally divided into five subsystems, as shown in FIG. 14. The main subsystems are call processing (CP) 800 and maintenance and administration (M&A) 801. Subsystems provided in support of these two are database management (DBM) 802, resource management (RM) 803, and an operating system (OS) 804. Functionally, an illustrative implementation of these subsystems parallels like subsystems of telephony electronic switching systems. Nevertheless, these subsystems are discussed below to complete the description of the network of FIGS. 1 and 2.

Call processing subsystem 800 is responsible for the establishment, management, and termination of subscriber calls, which are the smallest unit of connectivity between subscribers that are controllable by subscribers. Message-oriented signaling simplifies subsystem 800 in comparison with telephony call processing. Since a message request from a subscriber contains complete information about that request, less interaction is needed between subsystem 800 and equipment 400 to determine exactly what the subscriber wants. Also, since the message is complete, there is a decrease in the amount of state information that is needed to provide a context for interpreting and processing a request. Call processing software no longer has to determine the meaning of a subscriber's request based on internal state information retained as a result of previous interactions. However, it is still a function of subsystem 800 to determine if subscribers should be allowed to have access to the requested services.

Subsystem 800 is illustratively implemented in a one-process-per-subscriber-per-call form. Each message is processed by a process as a transaction. A transaction is any element of data, control, signal, event, or change of state that causes, triggers, or initiates some action or sequence of actions. For example, upon receiving an initial request for a service from an originating subscriber, call processing creates a process to handle the request. The process then accesses that subscriber's service capability information in database management subsystem 802 and analyzes that information based on the request made. If the subscriber's request is valid, then a sequence of actions needed to set up the call is initiated.

First, through interaction with resource management subsystem 803, the process requests that a path be allocated to connect the originating and destination subscribers. This action causes routing ard translation information on the destination subscriber to be accessed by subsystem 803. If subsystem 803 detects that the call is destined for a customer who is not a sutscriber to the network, the call is routed to the appropriate interface of external interface 603. If the call is destined for a network subscriber, when the destination subscriber is located, a process for the destination subscriber is created by subsystem 800. The destination subscriber's process notifies the destination subscriber of the intended call. As soon as the destination subscriber accepts the call, the call path is fully connected and the call becomes "active". The process monitoring the owner's, i.e., the subscriber's who is responsible for paying for this call, end of this call reccrds information concerning when this call starts and when it terminates. Until there are additional valid requests made by one of the participating subscribers to change the call, the call data remains unchanged. This data remains active in subsystem 800 until one of the subscribers issues a termination request.

It is the responsibility of maintenance and administration subsystem 801 to control maintenance capabilities provided for fault detection and recovery, so as to safeguard the integrity of the network. Specific responsibilities include: initialization, fault detection, reconfiguration, and diagnosis of suspected faulty equipment. With regard to fault detection, subsystem 801 provides a set of subroutines for use by subsystem 800 in reporting faults detected during normal processing. From these reported events, subsystem 801 determines when a suspected faulty hardware unit should be taken out of service. Out-of-service equipment is then scheduled for diagnosis. Subsystem 801 also schedules routine maintenance functions, including test calls (via loopback logic 411 located at subscribers' premises) and software audits. Subsystem 801 is also responsible for communicating with central node craft personnel for manual invocation of maintenance functions. The administrative portion of subsystem 801 is responsible for interfacing to regional support systems, and for interfacing to communication service vendors for update and retrieval of subscriber authorization and usage data stored in database management subsystem 802.

Resource management subsystem 803 manages the various physical resources of the network. It provides subsystem 800 with a single interface to the switches, thereby allowing subsystem 800 to not be burdened with the operational details associated therewith. The job of subsystem 803 involves the allocation of switch ports and channels of specific types or with specific transmission capabilities. In order to provide multimedia connectivity, subsystem 803 manages tables of information relating to the physical switching equipment and the state of that equipment. This information is very dynamic and is not directly associated with any particular subscriber.

Subsystem 803 talks to subsystem 800 about logical paths which consist of channels and ports. When subsystem 800 requests a path of a particular call type or format to be established between the originating and destination subscribers, subsystem 803 allocates the physical ports or channels that are required to establish the path. The particular type of switching equipment that is needed to provide the service and other information is determined by subsystem 803 from call type parameters specified by the subscriber in the call request message.

Database management subsystem 802 manages data about subscribers, network resources, and network resource usage, for use by the other network software subsystems. In particular, subsystem 802 manages data needed to map between each subscriber's directory number and its corresponding physical address on the appropriate remote node 103. Subsystem 802 also manages data describing the service capabilities of each subscriber. It further manages a representation of the current network configuration. This includes the current operational status of the various hardware components, which data is needed to allow the network to route around defective or otherwise unavailable components. Subsystem 802 also manages data about network resource usage, in the form of a transaction log containing information on when network resources were allocated and deallocated and showing which subscriber is to be billed for the resource usage. And finally, as a service to vendors of broadcast services, subsystem 802 maintains access right and usage information concerning broadcast services that may be initiated, i.e., called up, by subscribers.

Operating system 804 is a distributed switching operating system, for example a version of the operating system of the telephony 5ESS TM switching system of AT&T Technologies, Inc. System 804 provides a process environment for the other switching software subsystems. System 804 provides three fundamental services to the other subsystems: process control, whereby a process can create and destroy other processes, wait on certain conditions to be satisfied, etc.; process communications, whereby any process can send messages to any other process; and timing, whereby a process can request that it be notified after a certain amount of time has elapsed.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A communication network comprising:
   a plurality of communication links;
   wideband channel switching means coupled to the links and operable for establishing switched wideband channels on the links;
   narrowband channel switching means coupled to the links and operable for establishing switched narrowband channels on the links;
   control means, responsive to signaling messages received over the links for effecting operation of the wideband and the narrowband switching means and sending signaling messages over the links to effect establishment of wideband and narrowband communication paths through the wideband and the narrowband switching means over the channels;
   control communication means, interconnecting the wideband and the narrowband switching means with the control means, for communicating control signals among the control means and the wideband and the narrowband switching means, the signals for controlling establishment of the channels; and
   signal transfer means, responsive to receipt of signaling messages received over the links through the narrowband switching means for communicating these signaling messages to the control means over the control communication means, and responsive to receipt of signaling messages received from the control means over the control communication means for communicating these signaling messages over the links through the narrowband switching means.

2. A communication network for use in providing integrated voice, data, and video services between a plurality of pieces of equipment connected thereto by a plurality of channelized communication links, each piece of equipment connected to the network by a set of links comprising at least one link and providing a set of wideband communication channels comprising at least one wideband channel and a set of narrowband communication channels comprising at least one narrowband channel, a narrowband channel of each link set for carrying signaling messages for establishing communication connections over all channels of the link set, the network comprising:
   wideband digital channel switching means, coupled to links of the sets, for interconnecting wideband channels to establish wideband communication paths between pieces of equipment;
   narrowband digital channel switcing means, coupled to links of the sets, for interconnecting narrowband channels to establish narrowband communication paths between pieces of equipment;
   control means, responsive to signaling messages received from the pieces of equipment for sending control communications to the wideband and the narrowband switching means and sending signaling messages to the pieces of equipment to control establishment on the wideband and narrowband channels of wideband and narrowband communication paths between the pieces of equipment;
   control communication means, interconnecting the wideband and the narrowband switching means with the control means, for carrying control communications from the control means to the switching means; and
   signaling message transfer means, connected to the control communication means and having the signaling-message-carrying narrowband channels coupled thereto by the narrowband switching means, for transferring signaling messages incoming from the pieces of equipment on the coupled channels to the control means over the control communication means and for transferring signaling messages incoming from the control means over the control communication means to the pieces of equipment on the coupled channels.

3. The network of claim 2 wherein
   a plurality of the signaling message carrying narrowband channels are coupled to the signaling message transfer means in form of multiplexed signal streams one incoming from the narrowband switching means and one outgoing to the narrowband switching means and comprising a plurality of substreams, each substream comprising signals of different signaling-message-carrying narrowband channels, the signaling message transfer means comprising:
   multiplexing and demultiplexing means connected to the narrowband switching means for separating the incoming multiplexed stream into its constituent substreams and for combining into the outgoing multiplexed stream its constituent substreams;
   a plurality of processing means each coupled to the multiplexing and demultiplexing means to receive therefrom an incoming substream and to transmit thereto an outgoing substream, each processing means for extracting incoming messages from the received substream and forming outgoing messages into the transmitted substream;
   control communication interface means connected to the control communication means for transmitting incoming messages on the control communication means to the control means and receiving outgoing messages on the control communication means from the control means;
   transfer controlling means coupled between the plurality of processing means and the interface means for receiving incoming messages from the plurality of processing means and forwarding them to the interface means and receiving from the interface means outgoing messages and forwarding them to the processing means that are forming an outgoing substream comprising signals of a signaling-message-carrying channel leading to a piece of equipment for which the message is intended; and
   buffering means interposed between the plurality of processing means and the transfer controlling means for facilitating transfer of messages between the plurality of processing means and the transfer controlling means by temporarily storing messages being transferred therebetween.

4. The network of claim 2 wherein
   the signaling message transfer means include apparatus for serving a plurality of the signaling-messagecarrying narrowband channels one at a time on a rotating basis, the apparatus comprising:

first buffer storage means having the served channels coupled thereto, for buffering groups of signals incoming and outgoing on the served channels;

finite state machine means shared by the served channels and connected to the first buffer storage means to retrieve therefrom buffered incoming groups, one group at a time from each incoming served channel, the finite state machine means for identifying both signal types and source of each received incoming group and generating a source identifier and a type identifier for each received incoming group;

second buffer storage means for storing incoming and outgoing signal groups and their accompanying identifiers;

first control means connected to the finite state machine means and to the first and the second buffer storage means, responsive to receipt of the type identifiers from the finite state machine means for storing in the second buffer storage means those incoming groups retrieved from the first buffer storage means, and their source and type identifiers, received from the finite state machine means that are identified by their type identifiers as being groups of message signals, and discarding other incoming groups, and further responsive to type and destination identifiers, retrieved with the accompanying outgoing groups from the second buffer storage means, for generating outgoing groups and supplying the received and generated outgoing groups to the first buffer storage means one group at a time for each served outgoing channel; and second control means connected to the second buffer storage means and communicatively coupled to the control communication means, responsive to type and source identifiers retrieved from the second buffer storage means with their accompanying incoming groups for assembling the retrieved groups into incoming messages and transferring the incoming messages to the control communication means, and disassembling outgoing messages received from the control communication means into outgoing groups of message signals, generating a destination identifier and a type identifier for each outgoing group, and storing the outgoing groups along with their destination and type identifiers in the second buffer storage means.

5. The network of claim 2 further comprising:

a plurality of channelized optical fibers coupling a set of link sets comprising at least some of the link sets to the wideband and the narrowband switching means and providing a plurality of second communication channels for extending wideband and narrowband channels to the wideband and the narrowband switching means;

wideband digital channel handling means, connected between links of the set of link sets and the fibers, for connecting wideband channels of the connected links with second channels to establish wideband communication paths between the wideband switching means and pieces of equipment connected to the links of the set of link sets; and narrowband digital channel handling means, connected between links of the set of link sets and the fibers, for connecting narrowband channels of the connected links with second channels to establish narrowband communication paths between the narrowband switching means and pieces of equipment connected to the links of the set of link sets.

6. The network of claim 5 wherein the wideband handling means comprise second wideband digital channel switching means responsive to received control communications for connecting wideband channels with second channels; wherein the control communication means are further connected to the second wideband switching means; and wherein the control means are further responsive to the received signaling messages for sending control communications over the control communication means to the second wideband switching means to control establishment thereby of wideband communication paths.

7. The network of claim 5 wherein the narrowband handling means comprise narrowband digital channel multiplexing and demultiplexing means, connected between links of the set of link sets and the fibers, for multiplexing a plurality of narrowband channels of the connected links into a second channel and demultiplexing a second channel into a plurality of narrowband channels of the connected links to establish narrowband communication paths between the narrowband switching means and pieces of equipment.

8. The network of claim 5 wherein the second communication channels comprise a plurality of wideband-carrying channels each comprising at least one wideband channel and narrowband-carrying channels each comprising in multiplexed form a plurality of narrowband channels; wherein the wideband handling means comprise second wideband digital channel switching means, connected between links of the set of link sets and the fibers and coupled to the bus, responsive to control communications received over the bus from the control means for connecting wideband channels of the connected links with wideband channels of the wideband-carrying channels to establish wideband communication paths between the other wideband switching means and pieces of equipment connected to the links of the set of link sets; and wherein the narrowband handling means comprise narrowband digital channel multiplexing and demultiplexing means, connected between links of the set of link sets and the fibers, for multiplexing a plurality of narrowband channels of the connected links into narrowband channels of a narrowband-carrying channel and demultiplexing narrowband channels of a narrowband-carrying channel into a plurality of narrowband channels of the connected links to establish narrowband communication paths between the narrowband switching means and pieces of equipment connected to the links of the set of link sets.

9. A communication network for use in providing integrated voice, data, and video services between a plurality of pieces of equipment connected thereto by a plurality of first channelized communication links, each piece of equipment connected to the network by a set of first links comprising at least one first link and providing a set of wideband communication channels comprising at least one wideband channel and a set of narrowband communication channels comprising at least one narrowband channel, a narrowband channel of each first link set for carrying signaling messages for establishing communication connections over all channels of the first link set, the network comprising:

wideband channel switching means, coupled to links of the first link sets, for interconnecting wideband channels to establish wideband communication paths between pieces of equipment;

narrowband channel switching means, coupled to links of the first link sets, for interconnecting narrowband channels to establish narrowband communication paths between pieces of equipment;

a plurality of channelized second links coupling a set of first link sets, comprising at least some of the first link sets, to the wideband and the narrowband switching means and providing a plurality of second communication channels for extending wideband and narrowband channels to the wideband and the narrowband switching means;

wideband channel handling means, connected between first links of the set of first link sets and the second links, for connecting wideband channels of the connected first links with second channels to establish wideband communication paths between the wideband switching means and pieces of equipment connected to the first links of the set of first link sets;

narrowband channel handling means, connected between first links of the set of first link sets and the second links, for connecting narrowband channels of the connected first links with second channels to establish narrowband communication paths between the narrowband switching means and pieces of equipment connected to the first links of the set of first link sets; and control means connected to the wideband and the narrowband switching means and having second channels that are connected to the signaling-message-carrying narrowband channels coupled thereto, the control means responsive to signaling messages received from the pieces of equipment on the coupled channels for sending control communications to the wideband and the narrowband switching means and sending signaling messages to the pieces of equipment on the coupled channels to control establishment on wideband and narrowband channels of wideband and narrowband communication paths between the pieces of equipment.

10. A communication network for use in providing integrated voice, data, and video services between a plurality of pieces of equipment communicatively connected thereto, the network comprising:

a central switching node for establishing wideband and narrowband communication connections between the pieces of equipment;

a plurality of peripheral nodes, each for communicatively coupling a plurality of the pieces of equipment to the central node;

a plurality of channelized first optical fibers communicatively connecting the pieces of equipment to the plurality of peripheral nodes, each piece of equipment connected to one peripheral node by a set of first fibers comprising at least one first fiber and providing a set of wideband communication channels comprising at least one wideband channel and a set of narrowband communication channels comprising at least one narrowband channel, a narrowband channel of each first fiber set for carrying signaling messages for establishing communication connections over all channels of the first fiber set;

a plurality of channelized second optical fibers communicatively connecting the peripheral nodes with the central node, each peripheral node connected with the central node by its own set of second fibers comprising at least one second fiber and providing a plurality of second communication channels for carrying the wideband and the narrowband channels; wherein each peripheral node comprises wideband digital channel handling means, coupled to first fibers of first fiber sets connected to the peripheral node and to second fibers of the peripheral node's second fiber set, for connecting wideband channels with second channels to establish wideband communication paths between the central node and pieces of equipment connected to the peripheral node, and narrowband digital channel handling means, coupled to first fibers of first fiber sets connected to the peripheral node and to second fibers of the peripheral node's second fiber set, for connecting narrowband channels with second channels to establish narrowband communication paths between the central node and pieces of equipment connected to the peripheral node; and wherein the central switching node comprises wideband digital channel switching means, coupled to fibers of the sets, for interconnecting wideband channels carried by the second channels to establish wideband communication paths between pieces of equipment, narrowband digital channel switching means, coupled to fibers of the sets, for interconnecting narrowband channels carried by the second channels to establish narrowband communication paths between pieces of equipment, and node control means, coupled to the wideband and the narrowband switching means, responsive to signaling messages received from the pieces of equipment on the signaling-message-carrying narrowband channels for sending control communications to the wideband and the narrowband switching means and sending signaling messages to the pieces of equipment on the signaling-message-carrying narrowband channels, to control establishment of wideband and narrowband communication paths on the wideband and narrowband channels between the pieces of equipment.

11. The network of claim 10 further comprising a communication bus means, interconnecting the wideband and the narrowband switching means with the node control means, for carrying control communications from the node control means to the switching means; and signaling message transfer means, connected to the communication bus means and having the signaling-message-carrying narrowband channels carried by the second channels coupled thereto by the narrowband switching means, for transferring signaling messages incoming from the pieces of equipment on the coupled channels to the node control means over the bus means and transferring signaling messages incoming from the node control means over the bus means to the pieces of equipment on the coupled channels.

12. The network of claim 10 wherein
the node control means are further coupled to the wideband handling means of the plurality of peripheral nodes and are further responsive to the received signaling messages for sending control communications to the wideband handling means to control establishment thereby of wideband communication paths.

13. The network of claim 12 further comprising
a communication bus means, interconnecting the wideband and the narrowband switching means and the wideband handling means with the node control means, for carrying control communications from the node control means to the switching and the handling means; and
signaling message transfer means, connected to the communication bus means and having the signaling-message-carrying narrowband channels carried by the second channels coupled thereto by the narrowband switching means, for transferring signaling messages incoming from the pieces of equipment on the coupled channels to the node control means over the bus means and transferring signaling messages incoming from the node control means over the bus means to the pieces of equipment on the coupled channels.

14. The network of claim 10 wherein
the narrowband handling means comprise
narrowband digital channel multiplexing and demultiplexing means, coupled to first fibers of first fiber sets connected to the peripheral node and to second fibers of the peripheral node's second fiber set, for multiplexing a plurality of narrowband channels into a second channel and demultiplexing a second channel into a plurality of narrowband first channels to establish narrowband communication paths between the narrowband switching means and pieces of equipment connected to the peripheral node.

15. The network of claim 10 wherein
the second communication channels comprise
a plurality of wideband-carrying channels each comprising at least one wideband channel and narrowband-carrying channels each comprising a plurality of narrowband channels; wherein
the wideband handling means comprise
second wideband digital channel switching means, coupled to first fibers of first fiber sets connected to the peripheral node and to second fibers of the peripheral node's second fiber set, responsive to control communications received from the node control means for connecting wideband channels of first fibers with wideband channels of the wideband-carrying channels to establish wideband communication paths between the other wideband switching means and pieces of equipment connected to the peripheral node; and wherein
the narrowband handling means comprise
narrowband digital channel multiplexing and demultiplexing means, coupled to first fibers of first fiber sets connected to the peripheral node and to second fibers of the peripheral node's second fiber set, for multiplexing a plurality of narrowband channels of first fibers into narrowband channels of a narrowband-carrying channel and demultiplexing narrowband channels of a narrowband-carrying channel into a plurality of narrowband channels of first fibers to establish narrowband communication paths between the narrowband switching means and pieces of equipment connected to the peripheral node.

16. A communication network for use in providing integrated voice, data, and video services between a plurality of interface arrangements each for communicatively coupling at least one subscriber communication device to the network, the network comprising:
a central switching node for establishing wideband and narrowband communication connections between the interface arrangements;
a plurality of remote nodes each communicatively coupling a plurality of the interface arrangements to the central node;
a plurality of channelized first optical fibers communicatively connecting the interface arrangements with the remote nodes, each interface arrangement connected with one remote node by its own set of first fibers comprising at least one first fiber and providing a set of wideband first communication channels comprising at least one wideband first channel and a set of narrowband first communication channels comprising at least one narrowband first channel, a narrowband first channel of each first fiber set for carrying signaling messages for establishing communication connections over all channels of the first fiber set; and
a plurality of channelized second optical fibers communicatively connecting the remote nodes with the central node, each remote node connected with the central node by its own set of second fibers comprising at least one second fiber and providing a plurality of wideband-carrying channels each comprising at least one wideband second communication channel and at least one narrowband-carrying channel each comprising a plurality of narrowband second communication channels;
each remote node comprising
first wideband digital channel switching means, coupled to second fibers of the remote node's second fiber set and to first fibers of the first fiber sets that are connected to the remote node, responsive to control communications received from the central node for connecting wideband first channels with wideband second channels to establish wideband communication paths between the central node and the interface arrangements connected to the remote node, and
narrowband digital channel multiplexing and demultiplexing means, coupled to second fibers of the remote node's second fiber set and to first fibers of the first fiber sets that are connected to the remote node, for connecting the channels of a plurality of narrowband first channel sets with the second channels of a narrowband-carrying channel to establish narrowband communication paths between the central node and the interface arrangements connected to the remote node; and
the central node comprising
second wideband digital channel switching means, coupled to second fibers of the second fiber sets, responsive to received control communications for interconnecting wideband second channels to establish wideband communication paths between interface arrangements, narrowband digital channel switching means, coupled to second fibers of the second fiber sets, responsive to received control communications for interconnecting narrowband second channels to establish narrowband communication paths between interface arrangements, node control means, responsive to signaling messages received from the interface arrangements for sending control communications to the first and the second wideband switching means and the narrowband switching means and for sending signaling messages to the interface arrangements to control establishment of wideband and narrowband communication paths between the interface arrangements on the channels of the first and second fibers, communication bus means, interconnecting the first and second wideband switching means and the narrowband switching means with the node control means, for carrying control communications from the control means to the switching means, and signaling message transfer means, connected to the bus means and having second channels that are connected to signaling-message-carrying narrowband first channels coupled thereto by the narrowband switching means, for transferring signaling messages incoming from the interface arrangements on the coupled channels to the node control means over the bus means and transferring signaling messages incoming from the node control means over the bus means to the interface arrangements on the coupled channels.

17. The network of claim 16 wherein the first wideband switching means comprise first wideband digital channel switching fabric, connected to second fibers of the remote node's second fiber set and to first fibers of the first fiber sets that are connected to the remote node, for making and breaking connections between wideband first channels and wideband second channels, and first control means, coupled to the first wideband switching fabric, responsive to control communications received from the node control means for controlling the making and breaking of connections by the first wideband switching fabric;

wherein the second wideband switching means comprise second wideband digital channel switching fabric, connected to second fibers of the second fiber sets, for making and breaking connections between wideband second channels, and second control means, coupled to the second wideband switching fabric, responsive to control communications received from the node control means for controlling the making and breaking of connections by the second wideband switching fabric; and wherein the narrowband switching means comprise narrowband digital channel switching fabric, connected to second fibers of the second fiber sets, for making and breaking connections between narrowband second channels, and third control means, coupled to the narrowband switching fabric, responsive to control communications received from the node control means for controlling the making and breaking of connections by the narrowband switching fabric.

18. The network of claim 16, wherein a set of narrowband first channels comprises a plurality of narrowband first channels multiplexed into a multiplexed first channel, and wherein the narrowband digital channel multiplexing and demultiplexing means comprise means for connecting narrowband first channels of a plurality of multiplexed first channels with narrowband second channels of a narrowband-carrying channel.

19. The network of claim 16 wherein the first fibers comprise a plurality of downstream first optical fibers each for carrying communications from a remote node to an interface arrangement and a plurality of upstream first optical fibers each for carrying communications from an interface arrangement to a remote node, each interface arrangement connected with a remote node by at least one upstream and at least one downstream first fiber, the at least one upstream first fiber providing an upstream narrowband first channel for carrying signaling messages and the at least one downstream first optical fiber providing a downstream narrowband first channel for carrying signaling messages; wherein the second fibers comprise a plurality of downstream second optical fibers each for carrying communications from the central node to a remote node and a plurality of upstream second optical fibers each for carrying communications from a remote node to the central node, each remote node connected with the central node by at least one upstream and at least one downstream second fiber; wherein the first wideband digital channel switching means comprise means for connecting wideband first and second channels of upstream fibers and connecting wideband first and second channels of downstream fibers; wherein the narrowband digital channel multiplexing and demultiplexing means comprise means for connecting the channels of a plurality of narrowband first channel sets of upstream first fibers to the second channels of a narrowband-carrying channel of an upstream second fiber and connecting the second channels of a narrowband-carrying channel of a downstream second fiber to the channels of a plurality of narrowband first channel sets of downstream first fibers, wherein the second wideband digital channel switching means comprise means for connecting wideband second channels of the upstream second fibers with wideband second channels of the downstream second fibers; and wherein the narrowband digital channel switching means comprise means for connecting narrowband second channels of the upstream second fibers with narrowband second channels of the downstream second fibers.

20. The network of claim 16 wherein each set of first fibers provides at least one upstream wideband first channel and at least one upstream narrowband first channel each for carrying communications from an interface arrangement to a remote node, and further provides at least one downstream wideband first channel and at least one downstream narrowband first channel each for carrying communications from a remote node to a interface arrangement; wherein each set of second optical fibers provides at least one upstream wideband-carrying channel and at least one upstream narrowband-carrying channel each for carrying communications from a remote node to the central node, and further provides at least one downstream wideband-carrying channel and at least one downstream narrowband-carrying channel for carrying communications from the central node to a remote node; wherein the first wideband digital channel switching means comprise means for connecting upstream wideband first channels with upstream wideband second channels and connecting downstream wideband first channels with downstream wideband second channels; wherein the narrowband digital channel multiplexing and demultiplexing means comprise means for connecting the channels of a plurality of upstream narrowband first channel sets to the second channels of an upstream narrowband-carrying channel and connecting the second channels of a downstream narrowband-carrying channel to the channels of a plurality of downstream narrowband first channel sets; wherein the second wideband digital channel switching means comprise means for connecting upstream wideband second channels with downstream wideband second channels, and wherein the narrowband digital channel switching means comprise means for connecting upstream narrowband second channels with downstream narrowband second channels.

21. The network of claim 16 further comprising a plurality of network interface means each for optically coupling an interface arrangement to its own set of first fibers for communications.

22. The network of claim 16 wherein each first fiber comprises a first length of fiber and an associated second length of fiber, the network further comprising a plurality of distribution pedestals each coupling a plurality of first lengths of fibers to their associated second lengths of fibers.

23. The network of claim 16 further comprising:

a second central switching node;

a plurality of third optical fibers interconnecting the two central nodes and providing a set of wideband third communication channels comprising at least one wideband third channel, a set of narrowband third communication channels comprising at least one narrowband third channel, and a control communication channel;

the second central node comprising third wideband digital channel switching means, coupled to third fibers, responsive to received control communications for establishing wideband communication connections to wideband third channels to provide wideband communication paths between the two central nodes, second narrowband digital channel switching means, coupled to third fibers, responsive to received control communications for establishing narrowband communication connections to narrowband third channels to provide narrowband communication paths between the two central nodes.

second node control means, coupled to the third wideband and the second narrowband switching means and to the control communication channel, responsive to control messages received on the control channel for sending control communications to the third wideband and the second narrowband switching means to direct establishment of communication paths between the two central nodes; wherein the first wideband switching means are coupled to third optical fibers for connecting wideband second channels with wideband third channels to establish wideband communication paths between interface arrangements and the second central node; wherein the first narrowband digital channel switching means are coupled to third optical fibers for connecting narrowband second channels with narrowband third channels to establish narrowband communication paths between interface arrangements and the second central node; and wherein the first node control means are coupled to the control channel for sending control messages to the second node control means to control establishment of communication paths between the two central nodes.

24. The network of claim 23 further comprising second communication bus means interconnecting the third wideband switching means and the second narrowband switching means with the second node control means for carrying control communications therebetween;

first means coupling the bus means of the first node with the control channel for facilitating passage of control messages between the node control means of the two nodes via the control channel and the bus means of the first node; and second means coupling the second bus means to the control channel for facilitating passage of control messages between the node control means of the two nodes via the control channel and the second bus means.

25. The network of claim 16 further comprising:

external communication interface means, coupled to the narrowband switching means and via the bus means to the node control means, for establishing in cooperation with the node control means connections between narrowband second channels and communication channels of a communication system separate from the network, to provide narrowband communication paths between the network and the system.

26. The network of claim 25 wherein the external communication interface means comprise telephony interface means for connecting narrowband second channels with channels of a telephone system.

27. The network of claim 25 wherein the external communication interface means comprise data subscriber interface means for connecting narrowband second channels with channels of a data transport system.

28. The network of claim 16 further comprising:

wideband vendor communication interface means, coupled to the second wideband switching means and via the bus means to the node control means, for establishing in cooperation with the node control means connections between wideband second channels and communication channels of a provider of wideband communication services, to provide wideband communication paths between the network and the vendor.

29. The network of claim 16 further comprising
telemetry interface means, coupled to the control bus means, for facilitating passage of telemetry messages comprising telemetry data and control information between the bus means and a packet transport system; wherein
the signaling-message-carrying narrowband first channels further carry the telemetry messages; and wherein
the signaling message transfer means further transfer telemetry messages incoming from the interface arrangements on the coupled channels to the telemetry interface means over the bus means and transfer telemetry messages incoming from the telemetry interface means over the bus means to the interface arrangements on the coupled channels.

30. The network of claim 16 wherein
each first and second fiber conducts a plurality of wavelengths each carrying at least one first and second channel, respectively, whereby first and second channels are wavelength-division multiplexed on the first and second fibers, respectively.

31. The network of claim 30 wherein each narrowband-carrying channel carries a plurality of narrowband second channels in time-division-multiplexed form.

32. The network of claim 30 wherein
a set of narrowband first channels comprises
a plurality of narrowband first channels time-division-multiplexed into a multiplexed first channel; and wherein
each narrowband-carrying channel carries a plurality of multiplexed second channels in time-division-multiplexed form, with each multiplexed second channel comprising a plurality of narrowband second channels in time-division multiplexed form.

33. The network of claim 16 wherein each wideband switching means comprise a space-division digital switch.

34. The network of claim 16 wherein the narrowband switching means comprise a time-division digital switch.

35. The network of claim 16 wherein the narrowband multiplexing and demultiplexing means comprise a time-division digital switch.

36. A communication network for use in providing integrated digital wideband and narrowband voice, data, and video communication services between a plurality of interface arrangements each for communicatively coupling at least one subscriber communication device to the network, the network comprising:
a central switching node for establishing switched wideband and narrowband communication connections between the interface arrangements;
a plurality of remote nodes each communicatively coupling a plurality of the interface arrangements to the central node;
a control communication bus interconnecting the plurality of remote nodes with the central node;
a plurality of channelized first optical fibers communicatively connecting the interface arrangements with the remote nodes, each interface arrangement connected with one remote node by its own set of first fibers comprising at least one first fiber and providing a set of wideband first communication channels comprising at least one wideband first channel and at least one multiplexed first communication channel comprising a time-division multiplexed plurality of narrowband first communication channels, a narrowband first channel of each first fiber set for carrying signaling messages for establishing communication connections over all channels of the first fiber set, each first fiber carrying a plurality of wavelengths each defining at least one of the wideband and multiplexed first channels, whereby first channels are wavelength-division multiplexed on the first fibers;
a plurality of channelized second optical fibers communicatively connecting the remote nodes with the central node, each remote node connected with the central node by its own set of second fibers comprising at least one second fiber and providing at least one wideband second communication channel and at least one multiplexed second communication channel each comprising a multiplexed plurality of narrowband second communication channels, each second fiber carrying a plurality of wavelengths each defining at least one second channel, whereby second channels are wavelength-division multiplexed on the second fibers;
a plurality of network interfaces, one connected between each interface arrangement and its set of first fibers, each having transmitter means for wavelength-division multiplexing wideband and multiplexed first channels received from the interface arrangement into the connected fibers, and each further having receiver means for wavelength-division demultiplexing wideband and multiplexed first channels received on the connected fibers for use by the interface arrangement;
each remote node comprising
first wideband digital channel switching fabric, coupled to second fibers of the remote node's second fiber set and to first fibers of the first fiber sets connected to the remote node, for making and breaking connections between wideband first channels and wideband second channels to establish wideband communication paths between the central node and the interface arrangements connected to the remote node,
first control means, coupled to the first wideband fabric and to the communication bus, responsive to control communications received on the bus from the central node for controlling the making and breaking of connections by the first wideband fabric,
narrowband digital channel multiplexing and demultiplexing means, coupled to second fibers of the remote node's second fiber set and to first fibers of the first fiber sets connected to the remote node, for connecting the narrowband first channels of a plurality of multiplexed first channels with narrowband second channels of a multiplexed second channel to establish narrowband communication paths between the central node and the interface arrangements connected to the remote node,
first fiber interface means, interposed between both the first wideband switching fabric and the narrowband multiplexing and demultiplexing means and the first fibers, for wavelength-division multiplexing the first channels received from the first wideband switching fabric and the narrowband multiplexing and demultiplexing means onto the first fibers and wavelength-division demultiplexing first channels received on the first fibers for use by the first wideband switching fabric and the narrowband multiplexing and demultiplexing means, and second fiber interface means, interposed between both the first wideband switching fabric and the narrowband multiplexing and demultiplexing means and the second fibers, for wavelength-division multiplexing second channels received from the first wideband switching fabric and the narrowband multiplexing and demultiplexing means onto the second fibers and wavelength-division demultiplexing second channels received on the second fibers for use by the first wideband switching fabric and the narrowband multiplexing and demultiplexing means;

the central node comprising second wideband digital channel switching fabric, coupled to second fibers of the second fiber sets, for making and breaking connections between wideband second channels to establish wideband communication paths between interface arrangements, second control means, coupled to the second wideband fabric and to the communication bus, responsive to control communications received on the bus for controlling the making and breaking of connections by the second wideband fabric, narrowband digital channel switching fabric, coupled to second fibers of the second fiber sets, for making and breaking connections between narrowband second channels to establish narrowband communication paths between interface arrangements, third control means, coupled to the narrowband fabric and to the communication bus, responsive to control communications received on the bus for controlling the making and breaking of connections by the narrowband fabric;

third fiber interface means, interposed between both the second wideband and the narrowband switching fabrics and the second fibers, for wavelength-division multiplexing second channels received from the second switching fabrics onto the first fibers and wavelengthdivision demultiplexing second channels received on the second fibers for use by the second switching fabrics, node control means, coupled to the communication bus, responsive to signaling messages received from the interface arrangements for sending control communications to the first, second, and third control means on the bus and sending signaling messages to the interface arrangements, to control establishment of wideband and narrowband communication paths between the interface arrangements on the first and second channels, and signaling message transfer means, connected to the communication bus and having the narrowband second channels that are connected to the signaling-message-carrying narrowband first channels coupled thereto by the narrowband digital channel switching fabric, for transferring signaling messages incoming from the interface arrangements on the coupled channels to the node control means over the bus and transferring signaling messages incoming from the node control means over the bus to the interface arrangements on the coupled channels.

37. In combination a plurality of switching units each associated with a corresponding plurality of user terminals and inter-unit connection means, each of said switching units comprising narrowband switching mens for providing narrowband, switched communication channels between its associated user terminals and said inter-unit connection means, and wideband switching means for providing wideband, switched communication channels between its associataed user terminals and said inter-unit connection means, and said inter-unit connection means comprising switching means for connecting the narrowband switching means of all of said switching units to each other for inter-unit, narrowband switched communications, and switching means for connecting the wideband switching means of all of said switching units to each other for inter-unit, wideband switched communications.

38. The combination of claim 38 wherein said narrowband and said wideband switching means each further provides switched communication channels among its associataed user terminals.

39. In combination a plurality of switching units each associated with a corresponding plurality of user terminals and inter-unit connection means, each of said switching units comprising wideband switching means for providing wideband, switched communication channels between its associated user terminals and said inter-unit connection means, and said inter-unit connection means comprising switching means for connecting the wideband switching means of all of said switching units to each other for inter-unit, wideband, switched communication.

40. The combination of claim 39 wherein said wideband switching means each further provides switched communication channels among its associated user terminals.

* * * * *

UNITED STATES PATENT AND TRADEMARK OFFICE
CERTIFICATE OF CORRECTION

PATENT NO. : 4,763,317
DATED      : August 9, 1988
INVENTOR(S) : Harvey R. Lehman, et al It is certified that error appears in the above-identified patent and that said Letters Patent is hereby corrected as shown below:

Column 45, line 46, "and wavelengthdivision" should read --and wavelength-division--.

Signed and Sealed this

Sixteenth Day of February, 1993

Attest:

STEPHEN G. KUNIN

Attesting Officer

Acting Commissioner of Patents and Trademarks